United States Patent
Wang et al.

(10) Patent No.: US 11,811,561 B2
(45) Date of Patent: Nov. 7, 2023

(54) PACKET TRANSMISSION METHOD, DEVICE, AND SYSTEM

(71) Applicant: Huawei Technologies Co., Ltd., Shenzhen (CN)

(72) Inventors: Haibo Wang, Beijing (CN); Xun Hu, Nanjing (CN); Rongrong Hua, Nanjing (CN); Tong Zhu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 130 days.

(21) Appl. No.: 17/645,841

(22) Filed: Dec. 23, 2021

(65) Prior Publication Data
US 2022/0209995 A1 Jun. 30, 2022

(30) Foreign Application Priority Data
Dec. 25, 2020 (CN) .............................. 202011566677

(51) Int. Cl.
*H04L 12/46* (2006.01)
*H04L 45/00* (2022.01)
*H04L 45/745* (2022.01)

(52) U.S. Cl.
CPC .......... *H04L 12/4675* (2013.01); *H04L 45/22* (2013.01); *H04L 45/566* (2013.01); *H04L 45/745* (2013.01)

(58) Field of Classification Search
CPC ... H04L 12/4675; H04L 45/22; H04L 45/566; H04L 45/745; H04L 2012/4629; H04L 12/287; H04L 12/4641; H04L 45/50; H04L 45/16
See application file for complete search history.

(56) References Cited

U.S. PATENT DOCUMENTS

| | | | |
|---|---|---|---|
| 7,715,310 B1 | 5/2010 | Sajassi et al. | |
| 10,116,467 B2 | 10/2018 | Brissette et al. | |
| 10,454,715 B1 | 10/2019 | Uttaro et al. | |
| 10,454,814 B2 | 10/2019 | Brissette et al. | |
| 10,693,679 B2 | 6/2020 | Lin et al. | |
| 11,388,084 B2 * | 7/2022 | Sajassi | .................. H04L 12/462 |
| 2012/0170449 A1 * | 7/2012 | Nakash | ................... H04L 45/28 |
| | | | 370/216 |
| 2012/0198064 A1 | 8/2012 | Boutros et al. | |
| 2018/0109400 A1 | 4/2018 | Brissette et al. | |

(Continued)

FOREIGN PATENT DOCUMENTS

EP 2549688 A1 1/2013

*Primary Examiner* — Pao Sinkantarakorn
*Assistant Examiner* — Kabir U Jahangir
(74) *Attorney, Agent, or Firm* — Slater Matsil, LL

(57) ABSTRACT

A packet transmission method, device, and system are disclosed, and pertain to the field of network technologies. The system includes a first network device in a VPLS network and a second network device in a VPWS network. The first network device determines, based on a destination address carried in a received first packet, a virtual port corresponding to the destination address in a VPLS instance of the first network device, and sends the first packet to a second VPWS instance in the second network device based on the virtual port, where the virtual port is used to indicate a first VPWS instance in the first network device, and the second VPWS instance and the first VPWS instance are VPWS instances used to bear a same service.

20 Claims, 7 Drawing Sheets

(56) References Cited

U.S. PATENT DOCUMENTS

| | | |
|---|---|---|
| 2018/0359178 A1 | 12/2018 | Brissette et al. |
| 2019/0342119 A1 | 11/2019 | Uttaro et al. |
| 2019/0356581 A1 | 11/2019 | Brissette et al. |
| 2019/0394066 A1 | 12/2019 | Lin et al. |
| 2022/0174006 A1* | 6/2022 | Wang ...................... H04L 41/12 |

* cited by examiner

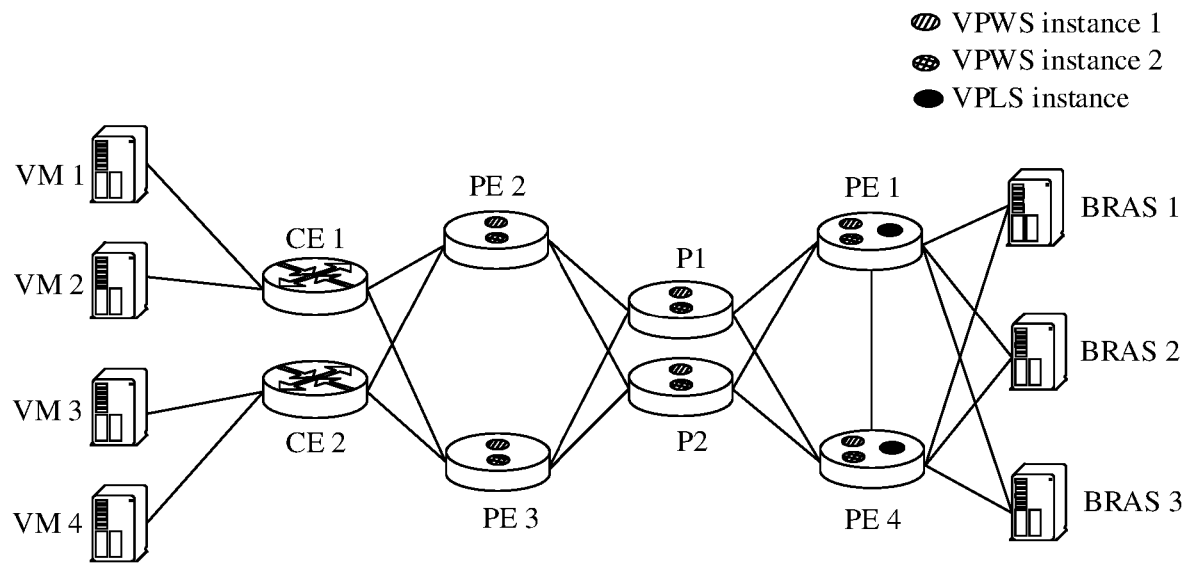

FIG. 3

| |
|---|
| A first network device determines, based on a destination address carried in a received first packet, a virtual port corresponding to the destination address in a VPLS instance of the first network device, where the virtual port is used to indicate a first VPWS instance in the first network device   401 |
| The first network device sends the first packet to a second VPWS instance in a second network device based on the virtual port, where the second VPWS instance in the second network device and the first VPWS instance in the first network device are VPWS instances used to bear a same service   402 |

FIG. 4

PACKET TRANSMISSION METHOD, DEVICE, AND SYSTEM

CROSS-REFERENCE TO RELATED APPLICATIONS

This application claims priority to Chinese Patent Application No. 202011566677.3, filed on Dec. 25, 2020, which is hereby incorporated by reference in its entirety.

TECHNICAL FIELD

This application relates to the field of network technologies, and in particular, to a packet transmission method, device, and system.

BACKGROUND

In a conventional layer 2 virtual private network (L2VPN), different provider edge (PE) devices may be configured to be connected through a virtual leased line pseudo wire (VLL PW). The different PE devices forward a packet through the VLL PW between the different PE devices. This reduces pressure on the PE device to learn a media access control (MAC) address.

With a feature of the VLL PW, the conventional L2VPN can reduce pressure on a PE device in the network to learn a MAC address. However, with development of technologies, currently all types of telecommunications services are evolving to an Ethernet virtual private network (EVPN) solution. Because EVPN signaling cannot support a VLL PW, a PE device in a current EVPN needs to learn a MAC address to forward a packet. As a result, pressure on the PE device to learn the MAC address is high, and a MAC entry in the PE device is complex, which may affect forwarding performance of the PE device.

SUMMARY

This application provides a packet transmission method, device, and system, to reduce pressure on a network device to learn a MAC address, simplify a MAC entry of the network device, and help ensure packet forwarding performance of a network system including the network device. The technical solutions of this application are as follows.

According to a first aspect, a packet transmission method is provided, where the method is applied to a system including a first network device and a second network device, the first network device is a device in a virtual private LAN service (VPLS) network, and the second network device is a device in a virtual private wire service (VPWS) network. The method includes: The first network device determines, based on a destination address carried in a received first packet, a virtual port corresponding to the destination address in a VPLS instance of the first network device, where the virtual port is used to indicate a first VPWS instance in the first network device; and the first network device sends the first packet to a second VPWS instance in the second network device based on the virtual port, where the second VPWS instance in the second network device and the first VPWS instance in the first network device are VPWS instances used to bear a same service.

According to the technical solutions provided in this application, the virtual port in the VPLS instance of the first network device indicates the first VPWS instance in the first network device, and the first VPWS instance in the first network device and the second VPWS instance in the second network device are used to bear a same service. After the first network device determines, based on the destination address carried in the received first packet, the virtual port corresponding to the destination address in the VPLS instance of the first network device, the first network device sends the first packet to the second VPWS instance in the second network device based on the virtual port. The second network device may forward the first packet by using the second VPWS instance. In this way, the first VPWS instance in the first network device may be used as a port member of the VPLS instance in the first network device. In this manner, the first VPWS instance is bound to the VPLS instance to implement interconnection between VPLS and VPWS in the first network device, so that when a packet reaches the second network device, the second network device can forward the packet by using a VPWS forwarding mechanism without learning a MAC address. This helps reduce pressure on the second network device to learn a MAC address, simplify a MAC entry of the second network device, and ensure forwarding performance of the entire network system.

Optionally, that the first network device sends the first packet to a second VPWS instance in the second network device based on the virtual port includes: The first network device determines a routing and forwarding table of the first VPWS instance based on the virtual port; and the first network device determines, based on the routing and forwarding table of the first VPWS instance, to send the first packet to the second VPWS instance in the second network device. For example, the first network device determines an egress port of the first packet in the first VPWS instance based on the routing and forwarding table of the first VPWS instance, and sends the first packet to the second network device through the egress port of the first packet in the first VPWS instance, to indicate the second network device to determine the second VPWS instance in the second network device to forward the first packet. For example, the routing and forwarding table of the first VPWS instance may be used to record a correspondence between a port identifier and association indication information. The port identifier is used to indicate a port corresponding to corresponding association indication information in the first VPWS instance. The association indication information is used to indicate a remote device (for example, the second network device) of the first network device to determine a VPWS instance (for example, the second VPWS instance) corresponding to the first VPWS instance. For example, the association indication information may be an identifier of a virtual private network (VPN) service borne in a VPWS instance in the remote device. For example, in a multiprotocol label switching (MPLS) network, the association indication information may be a VPN service label. In a segment routing internet protocol version 6 (SRv6) network, the association indication information may be a segment identifier (SID) of a VPN service.

According to the technical solutions provided in this application, the first network device determines the routing and forwarding table of the first VPWS instance, so that the first network device can determine the egress port of the first packet in the first VPWS instance based on the routing and forwarding table of the first VPWS instance. In this way, the second network device can directly forward the first packet of a user according to a VPWS mechanism without maintaining a MAC address of the user.

Optionally, the system further includes a third network device, and the third network device is a device in the VPWS network. The method includes: The first network device determines the virtual port based on the destination address carried in a received second packet; and the first network device sends the second packet to a third VPWS instance in the third network device based on the virtual port, where the third VPWS instance in the third network device and the first VPWS instance in the first network device are VPWS instances used to bear a same service. For example, the first network device may send the second packet to the third VPWS instance in the third network device according to a load sharing policy or an active/standby protection policy based on the virtual port corresponding to the destination address carried in the second packet. In this way, load balancing of the network devices in the packet transmission system or packet forwarding protection can be implemented. For example, this can avoid loss of the second packet because the second network device is faulty and fails to forward the packet.

According to the technical solutions provided in this application, the first network device determines, based on the destination address carried in the received second packet, the virtual port corresponding to the destination address in the VPLS instance of the first network device, and sends the second packet to the third VPWS instance in the third network device based on the virtual port corresponding to the destination address. In this way, load sharing or active/standby protection for the third network device and the second network device can be implemented, and load balancing of the network devices in the packet transmission system can be ensured, or packet forwarding protection can be ensured, for example, a packet loss rate of the packet transmission system can be reduced.

Optionally, that the first network device sends the second packet to a third VPWS instance in the third network device based on the virtual port includes: The first network device determines that a main forwarding path used to bear the service between the first network device and a device indicated by the destination address is faulty, where the second network device is located on the main forwarding path; and the first network device sends the second packet to the third VPWS instance in the third network device based on the main forwarding path fault and the virtual port, where the third network device is located on a backup forwarding path used to bear the service between the first network device and the device indicated by the destination address. That the main forwarding path is faulty may be: At least one network device on the main forwarding path is faulty, or a port of at least one network device on the main forwarding path is faulty, for example, the second network device is faulty.

According to the technical solutions provided in this application, after determining that the main forwarding path used to bear the service between the first network device and the destination device (that is, the device indicated by the destination address) is faulty, when receiving the second packet to be sent to the destination device, the first network device sends, based on the virtual port corresponding to the destination address carried in the second packet, the second packet to the third VPWS instance in the third network device located on the backup forwarding path between the first network device and the destination device. That is, the first network device sends the second packet to the destination device through the backup forwarding path, so that loss of the second packet caused by a fault of the main forwarding path can be avoided, and a packet loss rate of the packet transmission system can be reduced.

Optionally, the virtual port points to at least two VPWS instances that are of at least two network devices and that are used to bear the service, the at least two network devices including the VPWS instances are located on at least two forwarding paths between the first network device and the device indicated by the destination address, and the at least two forwarding paths are mutually load sharing paths, or the at least two forwarding paths include a main forwarding path and a backup forwarding path.

According to the technical solutions provided in this application, the first VPWS instance in the first network device is used to bear a service, and the virtual port corresponding to the destination address carried in the first packet points to at least two VPWS instances that are in at least two network devices and that are used to bear the service, so that at least two forwarding paths may exist between the first network device and the destination device (that is, the device indicated by the destination address). The at least two forwarding paths may be used to perform load sharing or active/standby protection for packets sent from the first network device to the destination device. For example, when a main forwarding path in the at least two forwarding paths is faulty, the first network device may send a packet to the destination device through a backup forwarding path. This helps reduce a packet loss rate of the packet transmission system.

Optionally, the VPLS instance includes a port of a virtual port type, that is, the VPLS instance includes a virtual port. The virtual port in the VPLS instance indicates a VPWS instance in the first network device. The VPLS instance may include one or more virtual ports, and the plurality of virtual ports may indicate different VPWS instances in the first network device. When the VPLS instance includes a plurality of virtual ports, the plurality of virtual ports may be isolated from each other, so that VPWS instances indicated by the plurality of virtual ports are isolated from each other, and user equipments mounted to the VPWS instances indicated by the plurality of virtual ports are prevented from accessing each other.

Optionally, the VPLS instance further includes at least one of a port of an access circuit (access circuit, AC) type and a port of an Ethernet virtual private network peer (EVPN Peer) type. The port of an AC type may be referred to as an AC port, and the port of an EVPN Peer type may be referred to as an EVPN Peer port. In the first network device, the AC port may be used by the first network device to communicate with a broadband access device, for example, a broadband remote access server (BRAS). The EVPN Peer port may be used by the first network device to communicate with a remote network device, for example, a remote PE device.

Optionally, that the first network device determines, based on a destination address carried in a received first packet, a virtual port corresponding to the destination address in a VPLS instance of the first network device includes: The first network device determines the virtual port corresponding to the destination address based on a fact that a port corresponding to the destination address in a routing and forwarding table of the VPLS instance of the first network device is the virtual port.

Optionally, that the first network device determines the virtual port corresponding to the destination address based on a fact that a port corresponding to the destination address in a routing and forwarding table of the VPLS instance of the first network device is the virtual port includes: The first network device determines the virtual port based on the destination address and a port identifier that are in the routing and forwarding table of the VPLS instance, where the port identifier is used to indicate the virtual port corresponding to the destination address in the VPLS instance and a type of the virtual port; or the first network device determines the virtual port based on the destination address, a port identifier, and a port type that are in the routing and forwarding table of the VPLS instance, where the port identifier indicates a port corresponding to the destination address in the VPLS instance, and the port type indicates that a type of the port is a virtual port type.

According to the technical solutions provided in this application, the port identifier may be used to indicate a port and a type of the port, or the port identifier may be used to indicate only a port. In a case in which the port identifier may be used to indicate both a port and a type of the port, the routing and forwarding table of the VPLS instance of the first network device may record a correspondence between an address and a port identifier. When the port identifier is used to indicate only a port, the routing and forwarding table of the VPLS instance of the first network device may record a correspondence between an address, a port identifier, and a port type. Regardless of the indication manner, the first network device may determine the port type based on the routing and forwarding table of the VPLS instance. This helps improve accuracy of determining, by the first network device based on the routing and forwarding table of the VPLS instance, the virtual port corresponding to the destination address carried in the first packet.

Optionally, before the first network device determines, based on the destination address carried in the received first packet, the virtual port corresponding to the destination address in the VPLS instance of the first network device, the method further includes: The first network device receives, by using the first VPWS instance in the first network device, a third packet sent by the second network device; and the first network device generates a forwarding entry in the routing and forwarding table of the VPLS instance based on a source address carried in the third packet and the first VPWS instance, where a destination address in the forwarding entry is the source address carried in the third packet, a port identifier in the forwarding entry is used to indicate the virtual port, and the virtual port is used to indicate the first VPWS instance in the first network device. For example, the first network device determines, in the VPLS instance of the first network device, the virtual port corresponding to the first VPWS instance, and generates the forwarding entry in the routing and forwarding table of the VPLS instance based on the source address carried in the third packet and the port identifier of the virtual port corresponding to the first VPWS instance.

According to the technical solutions provided in this application, the first network device receives, by using the first VPWS instance in the first network device, the third packet sent by the second network device, and generates the forwarding entry in the routing and forwarding table of the VPLS instance of the first network device based on the source address carried in the third packet and the first VPWS instance. In this way, when sending the first packet to the second network device, the first network device can determine, in the VPLS instance based on the routing and forwarding table of the VPLS instance, the virtual port corresponding to the destination address carried in the first packet and the first VPWS instance indicated by the virtual port.

Optionally, the method further includes: The first network device receives a fourth packet; and the first network device broadcasts the fourth packet through a plurality of ports of the VPLS instance based on a fact that a port corresponding to a destination address carried in the fourth packet is absent from the VPLS instance of the first network device, where the plurality of ports include the virtual port.

According to the technical solutions provided in this application, when the VPLS instance of the first network device does not include the port corresponding to the target address carried in the fourth packet, the first network device broadcasts the fourth packet through the plurality of ports of the VPLS instance. Therefore, the packet transmission solutions provided in this application can be applied to a packet broadcast scenario.

According to a second aspect, a packet transmission system is provided. The system includes a first network device and a second network device, the first network device is a device in a VPLS network, and the second network device is a device in a VPWS network.

The first network device is configured to: determine, based on a destination address carried in a received first packet, a virtual port corresponding to the destination address in a VPLS instance of the first network device, and send the first packet to a second VPWS instance in the second network device based on the virtual port, where the virtual port is used to indicate a first VPWS instance in the first network device, and the second VPWS instance in the second network device and the first VPWS instance in the first network device are VPWS instances used to bear a same service.

The second network device is configured to forward the first packet by using the second VPWS instance in the second network device.

Optionally, the first network device is specifically configured to: determine a routing and forwarding table of the first VPWS instance based on the virtual port; and determine, based on the routing and forwarding table of the first VPWS instance, to send the first packet to the second VPWS instance in the second network device.

Optionally, the system further includes a third network device, and the third network device is a device in the VPWS network.

The first network device is further configured to: determine the virtual port based on the destination address carried in a received second packet, and send the second packet to a third VPWS instance in the third network device based on the virtual port, where the third VPWS instance in the third network device and the first VPWS instance in the first network device are VPWS instances used to bear a same service.

The third network device is configured to forward the second packet by using the third VPWS instance in the third network device.

Optionally, the first network device is specifically configured to: determine that a main forwarding path used to bear the service between the first network device and a device indicated by the destination address is faulty, and send the second packet to the third VPWS instance in the third network device based on the main forwarding path fault and the virtual port, where the second network device is located on the main forwarding path, and the third network device is located on a backup forwarding path used to bear the service between the first network device and the device indicated by the destination address.

Optionally, the virtual port points to at least two VPWS instances that are of at least two network devices and that are used to bear the service, the at least two network devices including the VPWS instances are located on at least two forwarding paths between the first network device and the device indicated by the destination address, and the at least two forwarding paths are mutually load sharing paths, or the at least two forwarding paths include a main forwarding path and a backup forwarding path.

Optionally, the VPLS instance includes one or more virtual ports, and the plurality of virtual ports may indicate different VPWS instances in the first network device.

Optionally, the VPLS instance includes a port of a virtual port type.

Optionally, the VPLS instance further includes at least one of a port of an AC type and a port of an EVPN Peer type.

Optionally, the first network device is specifically configured to determine the virtual port corresponding to the destination address based on a fact that a port corresponding to the destination address in a routing and forwarding table of the VPLS instance of the first network device is the virtual port.

Optionally, the first network device is specifically configured to: determine the virtual port based on the destination address and a port identifier that are in the routing and forwarding table of the VPLS instance, where the port identifier is used to indicate the virtual port corresponding to the destination address in the VPLS instance and a type of the virtual port; or determine the virtual port based on the destination address, a port identifier, and a port type that are in the routing and forwarding table of the VPLS instance, where the port identifier indicates a port corresponding to the destination address in the VPLS instance, and the port type indicates that a type of the port is a virtual port type.

Optionally, the second network device is further configured to send a third packet to the first network device.

The first network device is further configured to: receive, by using the first VPWS instance in the first network device, the third packet sent by the second network device; and generate a forwarding entry in the routing and forwarding table of the VPLS instance based on a source address carried in the third packet and the first VPWS instance, where a destination address in the forwarding entry is the source address carried in the third packet, a port identifier in the forwarding entry is used to indicate the virtual port, and the virtual port is used to indicate the first VPWS instance in the first network device.

Optionally, the first network device is further configured to receive a fourth packet, and broadcast the fourth packet through a plurality of ports of the VPLS instance based on a fact that a port corresponding to a destination address carried in the fourth packet is absent from the VPLS instance of the first network device, where the plurality of ports include the virtual port.

Optionally, the first network device, the second network device, and the third network device are all PE devices.

For technical effects of the second aspect and the optional implementations of the second aspect, refer to the technical effects of the first aspect and the optional implementations of the first aspect. Details are not described herein again.

According to a third aspect, a first network device is provided. The first network device is in a packet transmission system, the system further includes a second network device, the first network device is a device in a VPLS network, and the second network device is a device in a VPWS network. The first network device includes: a determining module, configured to determine, based on a destination address carried in a received first packet, a virtual port corresponding to the destination address in the VPLS instance of the first network device, where the virtual port is used to indicate a first VPWS instance in the first network device; and a sending module, configured to send the first packet to a second VPWS instance in the second network device based on the virtual port, where the second VPWS instance in the second network device and the first VPWS instance in the first network device are VPWS instances used to bear a same service.

Optionally, the sending module is specifically configured to: determine a routing and forwarding table of the first VPWS instance based on the virtual port; and determine, based on the routing and forwarding table of the first VPWS instance, to send the first packet to the second VPWS instance in the second network device.

Optionally, the system further includes a third network device, and the third network device is a device in the VPWS network.

The determining module is further configured to determine the virtual port based on the destination address carried in a received second packet.

The sending module is further configured to send the second packet to a third VPWS instance in the third network device based on the virtual port, where the third VPWS instance in the third network device and the first VPWS instance in the first network device are VPWS instances used to bear a same service.

Optionally, the determining module is further configured to determine that a main forwarding path used to bear the service between the first network device and a device indicated by the destination address is faulty, where the second network device is located on the main forwarding path.

The sending module is specifically configured to send the second packet to the third VPWS instance in the third network device based on the main forwarding path fault and the virtual port, where the third network device is located on a backup forwarding path used to bear the service between the first network device and the device indicated by the destination address.

Optionally, the virtual port points to at least two VPWS instances that are of at least two network devices and that are used to bear the service, the at least two network devices including the VPWS instances are located on at least two forwarding paths between the first network device and the device indicated by the destination address, and the at least two forwarding paths are mutually load sharing paths, or the at least two forwarding paths include a main forwarding path and a backup forwarding path.

Optionally, the VPLS instance includes a port of a virtual port type.

Optionally, the VPLS instance further includes at least one of a port of an AC type and a port of an EVPN Peer type.

Optionally, the determining module is specifically configured to determine the virtual port corresponding to the destination address based on a fact that a port corresponding to the destination address in a routing and forwarding table of the VPLS instance of the first network device is the virtual port.

Optionally, the determining module is specifically configured to: determine the virtual port based on the destination address and a port identifier that are in the routing and forwarding table of the VPLS instance, where the port identifier is used to indicate the virtual port corresponding to the destination address in the VPLS instance and a type of the virtual port; or determine the virtual port based on the destination address, a port identifier, and a port type that are in the routing and forwarding table of the VPLS instance, where the port identifier indicates a port corresponding to the destination address in the VPLS instance, and the port type indicates that a type of the port is a virtual port type.

Optionally, the first network device further includes: a receiving module, configured to: before the determining module determines, based on the destination address carried in the received first packet, the virtual port corresponding to the destination address in the VPLS instance of the first network device, receive, by using the first VPWS instance in the first network device, a third packet sent by the second network device; and a processing module, configured to generate a forwarding entry in the routing and forwarding table of the VPLS instance based on a source address carried in the third packet and the first VPWS instance, where a destination address in the forwarding entry is the source address carried in the third packet, a port identifier in the forwarding entry is used to indicate the virtual port, and the virtual port is used to indicate the first VPWS instance in the first network device.

Optionally, the first network device further includes: a receiving module, configured to receive a fourth packet; and a broadcast module, configured to broadcast the fourth packet through a plurality of ports of the VPLS instance based on a fact that a port corresponding to a destination address carried in the fourth packet is absent from the VPLS instance of the first network device, where the plurality of ports include the virtual port.

For technical effects of the third aspect and the optional implementations of the third aspect, refer to the technical effects of the first aspect and the optional implementations of the first aspect. Details are not described herein again. The modules in the third aspect may be implemented based on software, hardware, or a combination of software and hardware, and the modules may be randomly combined or divided based on specific implementation.

According to a fourth aspect, a network device is provided. The network device includes a memory and a processor.

The memory is configured to store a computer program.

The processor is configured to execute the computer program stored in the memory, to perform the packet transmission method according to any one of the first aspect or the optional manners of the first aspect.

According to a fifth aspect, a computer-readable storage medium is provided. The computer-readable storage medium stores a computer program, and when the computer program is executed by a processor, the packet transmission method according to any one of the first aspect or the optional manners of the first aspect is implemented.

According to a sixth aspect, a computer program product that includes instructions is provided, and when the computer program product runs on a computer, the computer is enabled to perform the packet transmission method according to any one of the first aspect or the optional manners of the first aspect.

According to a seventh aspect, a chip is provided. The chip includes a programmable logic circuit and/or program instructions, and when the chip runs, the chip is configured to implement the packet transmission method according to any one of the first aspect or the optional manners of the first aspect.

According to an eighth aspect, a packet transmission system is provided. The packet transmission system includes a first network device and a second network device. The first network device is the network device provided in the third aspect, or the first network device is the network device provided in the fourth aspect. The first network device is configured to send a packet to a VPWS instance in the second network device by using a VPWS instance indicated by a virtual port in a VPLS instance of the first network device.

The technical solutions provided in this application bring the following beneficial effects.

This application provides a packet transmission method, device, and system. The system includes the first network device in the VPLS network and the second network device in the VPWS network. After receiving the first packet, the first network device determines, in the VPLS instance of the first network device based on the destination address carried in the first packet, the virtual port that is corresponding to the destination address and that is used to indicate the first VPWS instance of the first network device, and sends the first packet to the second network device based on the virtual port; and the second network device may determine to forward the first packet by using the second VPWS instance. In this way, the first VPWS instance in the first network device may be used as a port member of the VPLS instance in the first network device. In this manner, the first VPWS instance is bound to the VPLS instance to implement interconnection between VPLS and VPWS in the first network device, so that the second network device can forward a packet by using a VPWS forwarding mechanism without learning a MAC address of a user. This helps reduce pressure on the second network device to learn a MAC address, simplify a MAC entry of the second network device, and ensure packet forwarding performance of the network system.

BRIEF DESCRIPTION OF THE DRAWINGS

FIG. 3 is a schematic diagram of a structure of still another EVPN according to an embodiment of this application;

FIG. 4 is a flowchart of a packet transmission method according to an embodiment of this application;

DETAILED DESCRIPTION OF ILLUSTRATIVE EMBODIMENTS

Figure 1:
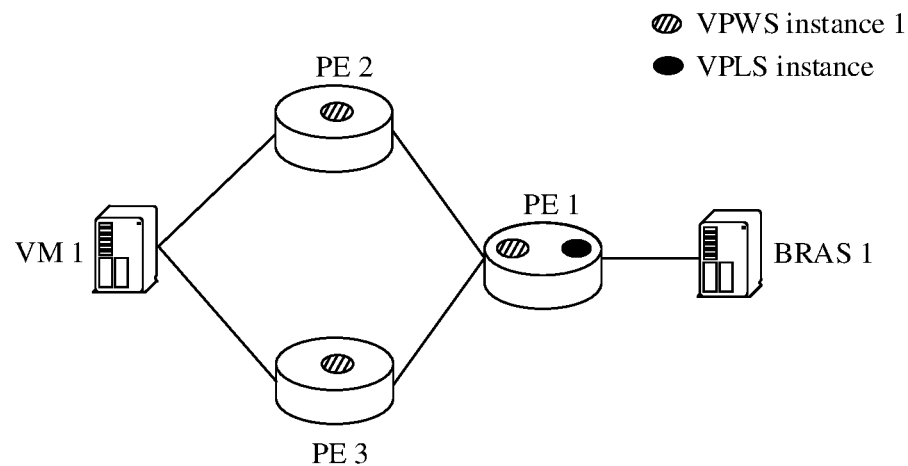
FIG. 1 is a schematic diagram of a structure of an EVPN according to an embodiment of this application.

To make principles, technical solutions, and advantages of this application clearer, the following further describes implementations of this application in detail with reference to accompanying drawings.

In a conventional L2VPN, PE devices can forward a packet through a VLL PW, to reduce pressure on a PE device to learn a MAC address. However, with the development of technologies, currently all types of telecommunications services are evolving to an EVPN solution. Because EVPN signaling cannot support a VLL PW, a PE device in a current EVPN needs to learn a MAC address to forward a packet. As a result, pressure on the PE device to learn the MAC address is high. The technical solutions provided in the embodiments of this application are applied to the EVPN, and can reduce pressure on a PE device to learn a MAC address. The following describes the technical solutions in the embodiments of this application.

An application scenario in the embodiments of this application is first described.

The technical solutions provided in the embodiments of this application may be applied to an EVPN. The EVPN may include a plurality of PE devices. The plurality of PE devices may communicate with each other to transfer user data. The plurality of PE devices may play corresponding roles based on different application scenarios. A user broadband access scenario is used as an example. An EVPN applied in this scenario may include a plurality of broadband access devices and a plurality of PE devices. Based on different roles played by the plurality of PE devices, the plurality of PE devices may include user access PE devices and broadband access PE devices. Each broadband access PE device is connected to at least one broadband access device, each user access PE device is used to connect at least one user equipment to the EVPN, and each broadband access PE device is connected to at least one user access PE device. The broadband access device is used to provide a broadband access service for user equipment mounted to a corresponding broadband access PE device (the user equipment may be mounted to a user access PE device, and mounted to a broadband access PE device by using the user access PE device).

In the EVPN applied to the user broadband access scenario, each PE device may be configured with at least one VPWS instance, and the broadband access PE device may further be configured with a VPLS instance. At least one VPWS instance in the user access PE device is in a one-to-one correspondence with at least one VPWS instance in the broadband access PE device, and the VPLS instance in the broadband access PE device corresponds to at least one broadband access device (in other words, the VPLS instance in the broadband access PE device is bound to at least one broadband access device). After a user access PE device receives a packet sent by user equipment mounted to the user access PE device, the user access PE device may forward the packet to a corresponding VPWS instance in a broadband access PE device by using a VPWS instance in the user access PE device. After receiving the packet by using the VPWS instance in the bandwidth access PE device, the broadband access PE device forwards the packet to a corresponding broadband access device by using a corresponding VPLS instance in the broadband access PE device. The broadband access device provides a broadband access service for the user equipment based on the packet.

The broadband access device may be a BRAS. The user equipment may be various types of devices such as a host, a user terminal, a server, or a virtual machine (virtual machine, VM) created on the server. The user equipment may generally be a dial-up access device, for example, an optical modem. The optical modem is also referred to as an optical modulator/demodulator or a single-port optical transceiver. A PE device may be a network device such as a router (router), a switch, a virtual router, or a virtual switch. PE devices may be directly connected or connected by using another network device (for example, a core device). This is not limited in the embodiments of this application.

For example, FIG. 1 is a schematic diagram of a structure of an EVPN applied to a user broadband access scenario according to an embodiment of this application. An example in which a broadband access device is a BRAS and user equipment is a VM is used for description in FIG. 1. As shown in FIG. 1, the EVPN includes BRAS 1 and three PE devices: PE 1 to PE 3 (that is, PE 1, PE 2, and PE 3). PE 1 is connected to both PE 2 and PE 3, PE 1 is connected to BRAS 1, and PE 2 and PE 3 are connected to VM 1 (that is, VM 1 is mounted to both PE 2 and PE 3, and VM 1 accesses the EVPN through PE 2 and PE 3). PE 1 to PE 3 may play different roles. PE 1 may be a broadband access PE device, and both PE 2 and PE 3 may be user access PE devices. PE 1 to PE 3 each are configured with at least one VPWS instance (only one VPWS instance, that is, VPWS instance 1 is shown in FIG. 1), and PE 1 is further configured with a VPLS instance. The VPWS instances in PE 1 to PE 3 are in a one-to-one correspondence, and the VPLS instance in PE 1 corresponds to BRAS 1 (in other words, the VPLS instance in PE 1 is bound to BRAS 1). The VPWS instances that are in a one-to-one correspondence in the PE devices may be used to bear a same service. For example, VPWS instances 1 in PE 1 to PE 3 in FIG. 1 are used to bear a same service.

For example, after receiving a packet sent by VM 1 mounted to PE 2, PE 2 may forward the packet to VPWS instance 1 in PE 1 by using VPWS instance 1 in PE 2. After receiving the packet by using VPWS instance 1 in PE 1, PE 1 forwards the packet to BRAS 1 by using the VPLS instance in PE 1. Then BRAS 1 provides a broadband access service for VM 1 based on the packet. For another example, after receiving, by using the VPLS instance in PE 1, a packet sent by BRAS 1, PE 1 forwards the packet to VPWS instance 1 in PE 2 by using VPWS instance 1 in PE 1. After receiving the packet by using VPWS instance 1 in PE 2, PE 2 forwards the packet to VM 1 by using VPWS instance 1 in PE 2. Optionally, after receiving, by using the VPLS instance in PE 1, a packet sent by BRAS 1, PE 1 may alternatively forward, according to a load sharing policy or an active/standby protection policy, the packet to VPWS instance 1 in PE 3 by using VPWS instance 1 in PE 1. After receiving the packet by using VPWS instance 1 in PE 3, PE 3 forwards the packet to VM 1 by using VPWS instance 1 in PE 3. VPWS instance 1 in PE 1 may include two ports (for example, EVPN Peer ports) corresponding to PE 2 and PE 3, so that PE 1 can forward a packet to VPWS instance 1 in PE 2 by using VPWS instance 1 in PE 1, and can also forward a packet to VPWS instance 1 in PE 3 by using VPWS instance 1 in PE 1.

Generally, an EVPN applied to a user broadband access scenario may include a plurality of broadband access devices, a plurality of broadband access PE devices, and a plurality of user access PE devices. Each broadband access PE device may be connected to at least one user access PE device, and each broadband access PE device may be connected to at least one broadband access device. At least one user equipment may be mounted to each user access PE device, and one user equipment may be mounted to different user access PE devices. In addition, when the EVPN includes a plurality of broadband access PE devices, the plurality of broadband access PE devices may be connected to each other, to implement dual-homing protection of the broadband access PE devices. For example, when a forwarding path between a broadband access PE device in the plurality of broadband access PE devices and a destination device (for example, user equipment) is faulty, and consequently the broadband access PE device cannot send a packet to the destination device through the forwarding path, the broadband access PE device may send the packet to a broadband access PE device connected to the broadband access PE device, and the broadband access PE device connected to the broadband access PE device sends the packet to the destination device, so as to implement dual-homing protection of the broadband access PE device.

Figure 2:
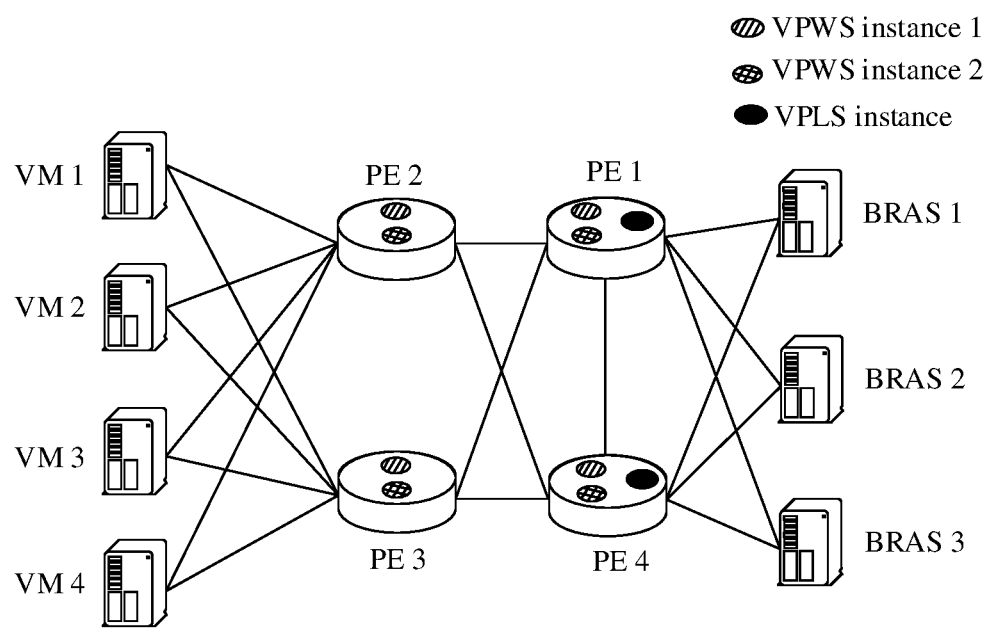
FIG. 2 is a schematic diagram of a structure of another EVPN according to an embodiment of this application.

For example, FIG. 2 is a schematic diagram of a structure of another EVPN applied to a user broadband access scenario according to an embodiment of this application. An example in which a broadband access device is a BRAS and user equipment is a VM is still used for description in FIG. 2. As shown in FIG. 2, the EVPN includes four PE devices: PE 1 to PE 4 (that is, PE 1, PE 2, PE 3, and PE 4), and three broadband access devices: BRAS 1 to BRAS 3 (that is, BRAS 1, BRAS 2, and BRAS 3). PE 1 and PE 4 each are connected to both PE 2 and PE 3, PE 1 and PE 4 each are connected to BRAS 1 to BRAS 3, PE 2 and PE 3 each are connected to VM 1 to VM 4 (that is, VM 1, VM 2, VM 3, and VM 4), and PE 1 and PE 4 are connected. PE 1 to PE 4 may play different roles. PE 1 and PE 4 may both be broadband access PE devices, and PE 2 and PE 3 may both be user access PE devices. PE 1 to PE 4 each are configured with at least one VPWS instance (only two VPWS instances: VPWS instance 1 and VPWS instance 2 are shown in FIG. 2), and PE 1 and PE 4 each are configured with a VPLS instance. The VPWS instances in PE 1 to PE 4 are in a one-to-one correspondence. The VPLS instance in PE 1 and the VPLS instance in PE 4 each correspond to BRAS 1 to BRAS 3 (in other words, the VPLS instance in PE 1 and the VPLS instance in PE 4 each are bound to BRAS 1 to BRAS 3). The VPWS instances that are in a one-to-one correspondence in the PE devices may be used to bear a same service. For example, in FIG. 2, VPWS instances 1 in PE 1 to PE 4 are in a one-to-one correspondence, and VPWS instances 1 in PE 1 to PE 4 are used to bear a same service; VPWS instances 2 in PE 1 to PE 4 are in a one-to-one correspondence, and VPWS instances 2 in PE 1 to PE 4 are used to bear a same service. VPWS instance 1 and VPWS instance 2 may bear different services.

For example, after receiving a packet sent by VM 1 mounted to PE 2, PE 2 may forward the packet to VPWS instance 1 in PE 1 by using VPWS instance 1 in PE 2. After receiving the packet by using VPWS instance 1 in PE 1, PE 1 forwards the packet to BRAS 1 by using the VPLS instance in PE 1, and BRAS 1 provides a broadband access service for VM 1 based on the packet. For another example, after receiving, by using the VPLS instance in PE 1, a packet sent by BRAS 1, PE 1 forwards the packet to VPWS instance 1 in PE 2 by using VPWS instance 1 corresponding to the VPLS instance. After receiving the packet by using VPWS instance 1 in PE 2, PE 2 forwards the packet to VM 1 by using VPWS instance 1 in PE 2. Optionally, after receiving, by using the VPLS instance in PE 1, a packet sent by BRAS 1, PE 1 may alternatively forward, according to a load sharing policy or an active/standby protection policy, the packet to VPWS instance 1 in PE 3 by using VPWS instance 1 in PE 1. After receiving the packet by using VPWS instance 1 in PE 3, PE 3 forwards the packet to VM 1 by using VPWS instance 1 in PE 3.

Optionally, after PE 1 receives, by using the VPLS instance in PE 1, a packet sent by BRAS 1, if a forwarding path between PE 1 and VM 1 is faulty (for example, VPWS instance 1 in PE 1 is faulty), and consequently PE 1 cannot send the packet to VM 1 through the forwarding path, PE 1 may forward the packet to PE 4 by using the VPLS instance in PE 1, and PE 4 sends the packet to VM 1, so as to implement dual-homing protection for PE 1 and PE 4.

Generally, an EVPN further includes an edge access device and a core device, and PE devices may be connected by using the core device. In an EVPN applied to a user broadband access scenario, an edge access device may be connected to a user access PE device, and user equipment is connected to the user access PE device through the edge access device, that is, the user equipment is mounted to the edge access device, and is connected to the user access PE device through the edge access device. The edge access device may be, for example, a customer edge (CE) device, and the core device may be, for example, a provider (P) device. The CE device and the P device each may be a network device such as a router, a switch, a virtual router, or a virtual switch, and the CE device may alternatively be an optical line terminal (OLT). Optionally, each P device may be configured with at least one VPWS instance, and the VPWS instance in the P device is in a one-to-one correspondence with a VPWS instance in a user access PE device and a VPWS instance in a broadband access PE device. The P device may forward a packet between the user access PE device and the broadband access PE device by using the VPWS instance in the P device.

For example, FIG. 3 is a schematic diagram of a structure of still another EVPN applied to a user broadband access scenario according to an embodiment of this application. An example in which a broadband access device is a BRAS and user equipment is a VM is still used for description in FIG. 3. Refer to FIG. 3. On the basis of FIG. 2, the EVPN in FIG. 3 further includes two CE devices: CE 1 and CE 2, and two P devices: P1 and P2. Each P device in P1 and P2 is connected to PE 1 to PE 4, each CE device in CE 1 and CE 2 is connected to PE 2 and PE 3, CE 1 is connected to VM 1 and VM 2, and CE 2 is connected to VM 3 and VM 4. That is, each PE device in PE 1 and PE 4 is connected to PE 2 and PE 3 by using P1 and P2, each VM in VM 1 to VM 4 is connected to PE 2 and PE 3 by using CE 1 and CE 2, and each VM in VM 1 to VM 4 is mounted to CE 1 and CE 2. For descriptions of PE 1 to PE 4 and descriptions of VPWS instances and VPLS instances in PE 1 to PE 4, refer to related descriptions of the EVPN shown in FIG. 2. Details are not described herein again in this embodiment of this application. As shown in FIGS. 3, P1 and P2 each are configured with at least one VPWS instance (only two VPWS instances: VPWS instance 1 and VPWS instance 2 are shown in FIG. 3), the VPWS instances in P1 are in a one-to-one correspondence with the VPWS instances in each of PE 1 to PE 4, and the VPWS instances in P2 are in a one-to-one correspondence with the VPWS instances in each of PE 1 to PE 4. The VPWS instances that are in a one-to-one correspondence in the PE devices and the P devices may be used to bear a same service. For example, in FIG. 3, VPWS instances 1 in PE 1 to PE 4, P1, and P2 are in a one-to-one correspondence, and VPWS instances 1 in PE 1 to PE 4, P1, and P2 are used to bear a same service; VPWS instances 2 in PE 1 to PE 4, P1, and P2 are in a one-to-one correspondence, and VPWS instances 2 in PE 1 to PE 4, P1, and P2 are used to bear a same service. VPWS instance 1 and VPWS instance 2 may bear different services. In the EVPN shown in FIG. 3, the VPWS instances in each of the PE devices and the P devices may be in a one-to-one correspondence with the CE devices. For example, VPWS instance 1 in each of the PE devices and the P devices corresponds to CE 1, and VPWS instance 2 in each of the PE devices and the P devices corresponds to CE 2. This is not limited in this embodiment of this application.

For example, after receiving a packet sent by VM 1 mounted to PE 2 (this packet may be forwarded through CE 1), PE 2 may forward the packet to VPWS instance 1 in P1 by using VPWS instance 1 corresponding to CE 1 in PE 2. After P1 receives the packet by using VPWS instance 1 in P1, P1 forwards the packet to VPWS instance 1 in PE 1 by using VPWS instance 1 in P1. After PE 1 receives the packet by using VPWS instance 1 in PE 1, PE 1 forwards the packet to BRAS 1 by using the corresponding VPLS instance in PE 1, and BRAS 1 provides a broadband access service for VM 1 based on the packet. For another example, after receiving, by using the VPLS instance in PE 1, a packet sent by BRAS 1, PE 1 forwards the packet to VPWS instance 1 in P1 by using VPWS instance 1 corresponding to the VPLS instance. After receiving the packet by using VPWS instance 1 in P1, P1 forwards the packet to VPWS instance 1 in PE 2 by using VPWS instance 1 in P1. After receiving the packet by using VPWS instance 1 in PE 2, PE 2 forwards the packet to CE 1 by using VPWS instance 1 in PE 2, and CE 1 forwards the packet to VM 1 based on a destination address carried in the packet. Optionally, after receiving, by using the VPLS instance in PE 1, a packet sent by BRAS 1, PE 1 may alternatively forward, according to a load sharing policy or an active/standby protection policy, the packet to VPWS instance 1 in P2 by using VPWS instance 1 in PE 1. After receiving the packet by using VPWS instance 1 in P2, P2 forwards the packet to VPWS instance 1 in PE 3 by using VPWS instance 1 in P2. After receiving the packet by using VPWS instance 1 in PE 3, PE 3 forwards the packet to CE 1 by using VPWS instance 1 in PE 3, and CE 1 forwards the packet to VM 1 based on a destination address carried in the packet.

In the embodiments of this application, the EVPNs shown in FIG. 1 to FIG. 3 are merely examples, but are not intended to limit the technical solutions in the embodiments of this application. In a specific implementation process, quantities of PE devices, CE devices, P devices, and BRASs may be configured as required. A specific role that each type of device needs to play may be determined based on an application scenario. In addition, the EVPN may further include another network device. For example, the EVPN may further include a route reflector (route reflector, RR). This is not limited in the embodiments of this application. In addition, in the embodiments of this application, for ease of description, in the user broadband access scenario, a PE device connected to user equipment is referred to as a user access PE device, and a PE device connected to a broadband access device is referred to as a broadband access PE device. However, this description is merely an example. Both the user access PE device and the broadband access PE device are PE devices. In another implementation scenario, the user access PE device and the broadband access PE device may be described by using other names, or types of the PE devices may not be distinguished. This is not limited in the embodiments of this application.

In the foregoing EVPN, a VPWS instance and a VPLS instance in a broadband access PE device (for example, PE 1) may be bound (or associated), so that in the broadband access PE device, the VPWS instance corresponds to the VPLS instance, that is, interconnection between VPWS and VPLS in the broadband access PE device is implemented. Therefore, after receiving, by using the VPLS instance in the broadband access PE device, a packet sent by a broadband access device (for example, BRAS 1), the broadband access PE device may forward the packet to a corresponding VPWS instance in a user access PE device (for example, PE 2) by using the VPWS instance bound to (or associated with) the VPLS instance in the broadband access PE device. The user access PE device may forward the packet by using the VPWS instance in the user access PE device, so that the user access PE device can forward the packet by using a VPWS forwarding mechanism without learning a MAC address, and pressure on the user access PE device to learn a MAC address is reduced.

In the technical solutions provided in the embodiments of this application, a virtual port used to indicate a VPWS instance in a broadband access PE device may be configured in a VPLS instance in the broadband access PE device. In this manner, the VPWS instance and the VPLS instance in the broadband access PE device are bound. In this way, the broadband access PE device can determine, based on the virtual port in the VPLS instance, the VPWS instance that is in the broadband access PE device and that is bound to the VPLS instance, and therefore forward a packet to a user access PE device by using the VPWS instance in the broadband access PE device. In the technical solutions provided in the embodiments of this application, the user access PE device can forward a packet by using a VPWS forwarding mechanism without learning a MAC address. This reduces pressure on the user access PE to learn the MAC address. The following describes in detail the technical solutions in the embodiments of this application with reference to the accompanying drawings.

For example, FIG. 4 is a flowchart of a packet transmission method according to an embodiment of this application. The packet transmission method may be applied to a system including a first network device and a second network device, the first network device is a device in a VPLS network, and the second network device is a device in a VPWS network. For example, as shown in FIG. 1 to FIG. 3, the first network device may be PE 1, and the second network device may be PE 2. As shown in FIG. 4, the method may include the following steps.

S401: The first network device determines, based on a destination address carried in a received first packet, a virtual port corresponding to the destination address in a VPLS instance of the first network device, where the virtual port is used to indicate a first VPWS instance in the first network device.

Optionally, at least one VPLS instance may be configured in the first network device, each of the at least one VPLS instance may include a plurality of ports, each port has one type, and a type of each port may be a virtual port type, an AC type, or an EVPN Peer type. A port of the virtual port type may be referred to as a virtual port, a port of the AC type may be referred to as an AC port, and a port of the EVPN Peer type may be referred to as an EVPN Peer port. The AC port may be used by the first network device to communicate with a broadband access device (for example, a BRAS). The EVPN Peer port may be used by the first network device to communicate with a remote network device (for example, a remote PE device). In some implementation scenarios, the VPLS instance may also be referred to as a bridge domain (bridge domain, BD). For example, when a BD includes both an AC port and an EVPN Peer port, the VPLS instance described in this embodiment of this application may also be referred to as a BD.

Optionally, at least one VPWS instance may be further configured in the first network device, and the virtual port in the VPLS instance in the first network device may indicate the VPWS instance in the first network device, so that the VPLS instance in the first network device may be bound to the VPWS instance in the first network device by using the virtual port in the VPLS instance, to implement interconnection between VPLS and VPWS. Optionally, the VPLS instance may include one or more virtual ports. When the VPLS instance includes a plurality of virtual ports, the plurality of virtual ports may indicate different VPWS instances in the first network device. In the first network device, each VPWS instance may include at least one port, and a type of the port in the VPWS instance may be an EVPN Peer type, that is, the port in the VPWS instance may be an EVPN Peer port. Optionally, The VPWS instance may further include an AC port. This is not limited in this embodiment of this application. In this embodiment of this application, when the VPLS instance includes a plurality of virtual ports, the plurality of virtual ports may be isolated from each other, so that VPWS instances indicated by the plurality of virtual ports are isolated from each other, and user equipments mounted to the VPWS instances indicated by the plurality of virtual ports are prevented from accessing each other. For example, a switch may be configured in the VPLS instance, and the plurality of virtual ports included in the VPLS instance are controlled to be isolated from each other by using the switch.

Figure 5:
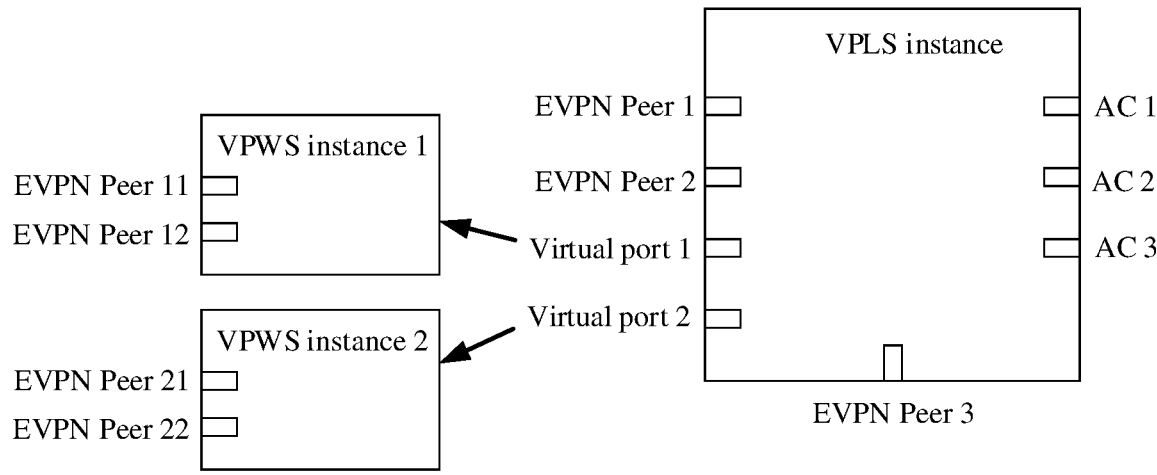
FIG. 5 is a schematic diagram of a relationship between a VPLS instance and VPWS instances according to an embodiment of this application.

For example, FIG. 5 shows a schematic diagram of a relationship between a VPLS instance and VPWS instances in a first network device (for example, PE 1 in FIG. 1 to FIG. 3) according to an embodiment of this application. As shown in FIG. 5, the first network device includes one VPLS instance and two VPWS instances, and the two VPWS instances are respectively VPWS instance 1 and VPWS instance 2. The VPLS instance includes three AC ports: AC 1, AC 2, and AC 3, three EVPN Peer ports: EVPN Peer 1, EVPN Peer 2, and EVPN Peer 3, and two virtual ports: virtual port 1 and virtual port 2. Virtual port 1 is used to indicate VPWS instance 1, and virtual port 2 is used to indicate VPWS instance 2. VPWS instance 1 includes two EVPN Peer ports: EVPN Peer 11 and EVPN Peer 12. VPWS instance 2 includes two EVPN Peer ports: EVPN Peer 21 and EVPN Peer 22. Virtual port 1 and virtual port 2 may be isolated from each other, so that VPWS instance 1 indicated by virtual port 1 and VPWS instance 2 indicated by virtual port 2 are isolated from each other, and user equipments mounted to VPWS instance 1 and VPWS instance 2 are prevented from accessing each other.

After receiving the first packet, the first network device may parse the first packet, to determine, from the first packet, the destination address carried in the first packet, and then determine, in the VPLS instance of the first network device based on the destination address carried in the first packet, the virtual port corresponding to the destination address. The virtual port is used to indicate the first VPWS instance in the first network device, and the first packet may come from a broadband access device, for example, a BRAS. In this embodiment of this application, the VPLS instance includes a port of a virtual port type (that is, a virtual port). In an optional implementation, the VPLS instance may further include at least one of a port of an AC type (that is, an AC port) and a port of an EVPN Peer type (that is, an EVPN Peer port). This is not limited in this embodiment of this application. For example, the VPLS instance may be the VPLS instance shown in FIG. 5, and the VPLS instance includes two virtual ports, three AC ports, and two EVPN Peer ports.

Optionally, the first network device may maintain a routing and forwarding table of the VPLS instance of the first network device, and the first network device may determine the virtual port corresponding to the destination address based on a fact that a port corresponding to the destination address carried in the first packet is a virtual port in the routing and forwarding table of the VPLS instance. In this embodiment of this application, the routing and forwarding table of the VPLS instance records a correspondence between an address (for example, a MAC address) and a port identifier. In the routing and forwarding table of the VPLS instance, the port identifier may be used to indicate a port corresponding to a corresponding address in the VPLS instance and a type of the port, or the port identifier is used to indicate only a port corresponding to a corresponding address in the VPLS instance. Based on different content indicated by the port identifier in the routing and forwarding table of the VPLS instance, the routing and forwarding table of the VPLS instance may include two possible implementations. Correspondingly, The determining, by the first network device based on the routing and forwarding table of the VPLS instance, the virtual port corresponding to the destination address carried in the first packet also includes two possible implementations. The following describes the two implementations.

First implementation: The routing and forwarding table of the VPLS instance records a correspondence between an address and a port identifier, and the port identifier is used to indicate a port corresponding to a corresponding address in the VPLS instance and a type of the port. Each type of port corresponds to a different type of port identifier, and each type of port identifier may indicate one type of port, so that in the routing and forwarding table of the VPLS instance, the port identifier may be used to indicate a port and a type of the port. The first network device may determine, from the routing and forwarding table of the VPLS instance, an address that matches (for example, is the same as) the destination address carried in the first packet, determine a port identifier corresponding to the address that matches the destination address, and determine a virtual port indicated by the port identifier corresponding to the address matching the destination address as the virtual port corresponding to the destination address carried in the first packet.

For example, the routing and forwarding table of the VPLS instance may be shown in Table 1. In Table 1, an example in which addresses in the routing and forwarding table of the VPLS instance are MAC addresses is used for description. Content in each row in Table 1 may be one forwarding entry.

TABLE 1

| Address | Port identifier |
| --- | --- |
| MAC address 1 | $V\text{-}P_1$ |
| MAC address 2 | $V\text{-}P_2$ |
| MAC address 3 | $AC\text{-}P_1$ |
| MAC address 4 | $AC\text{-}P_2$ |
| MAC address 5 | $AC\text{-}P_3$ |
| MAC address 6 | EVPN Peer-$P_1$ |
| MAC address 7 | EVPN Peer-$P_2$ |
| MAC address 8 | EVPN Peer-$P_3$ |

As shown in Table 1, the routing and forwarding table of the VPLS instance records MAC addresses 1 to 8 and port identifiers corresponding to the MAC addresses. The port identifiers V-P1 and V-P2 sequentially indicate virtual port 1 and virtual port 2 (that is, types of the ports indicated by the port identifiers V-P1 and V-P2 are both virtual port types). The port identifiers AC-P1, AC-P2, and AC-P3 sequentially indicate AC port 1, AC port 2, and AC port 3 (that is, types of the ports indicated by the port identifiers AC-P1, AC-P2, and AC-P3 are all AC types). The port identifiers EVPN Peer-P1, EVPN Peer-P2, and EVPN Peer-P3 sequentially indicate EVPN Peer port 1, EVPN Peer port 2, and EVPN Peer port 3 (that is, types of the ports indicated by the port identifiers EVPN Peer-P1, EVPN Peer-P2, and EVPN Peer-P3 are all EVPN Peer types).

It is assumed that the first network device determines, from the routing and forwarding table of the VPLS instance shown in Table 1, that the address matching the destination address carried in the first packet is MAC address 1. It can be learned from Table 1 that a port identifier corresponding to MAC address 1 in the routing and forwarding table of the VPLS instance is V-P1, and the port identifier V-P1 indicates virtual port 1 (that is, the type of the port indicated by the port identifier V-P1 is the virtual port type). The first network device determines virtual port 1 indicated by the port identifier V-P1 as the virtual port corresponding to the destination address carried in the first packet.

Second implementation: The routing and forwarding table of the VPLS instance records a correspondence between an address and a port identifier, and the port identifier is used to indicate a port corresponding to a corresponding address in the VPLS instance. In this case, the routing and forwarding table of the VPLS instance may further record a port type, and the port type is used to indicate a type of a port indicated by a corresponding port identifier. That is, in the second implementation, the routing and forwarding table of the VPLS instance may record a correspondence between an address, a port identifier, and a port type. The port identifier is used to indicate a port corresponding to a corresponding address in the VPLS instance. The port type is used to indicate a type of a port indicated by a corresponding port identifier. The first network device may determine, from the routing and forwarding table of the VPLS instance, an address that matches (for example, is the same as) the destination address carried in the first packet, determine a port identifier corresponding to the address that matches the destination address, and determine a virtual port indicated by the port identifier corresponding to the address matching the destination address as the virtual port corresponding to the destination address carried in the first packet.

For example, the routing and forwarding table of the VPLS instance may be shown in Table 2. In Table 2, an example in which addresses in the routing and forwarding table of the VPLS instance are MAC addresses is used for description. Content in each row in Table 2 may be one forwarding entry.

TABLE 2

| Address | Port identifier | Port type |
| --- | --- | --- |
| MAC address 1 | $P_1$ | Virtual port type |
| MAC address 2 | $P_2$ | Virtual port type |
| MAC address 3 | $P_3$ | AC type |
| MAC address 4 | $P_4$ | AC type |
| MAC address 5 | $P_5$ | AC type |
| MAC address 6 | P6 | EVPN Peer type |
| MAC address 7 | $P_7$ | EVPN Peer type |
| MAC address 8 | P8 | EVPN Peer type |

As shown in Table 2, the routing and forwarding table of the VPLS instance records MAC addresses 1 to 8 and port identifiers corresponding to the MAC addresses. The port identifiers P1 to P8 sequentially indicate ports 1 to 8 in the VPLS instance, port types indicated by the port identifiers P1 and P2 are virtual port types, port types indicated by the port identifiers P3 to P5 are AC types, and port types indicated by the port identifiers P6 to P8 are EVPN Peer types. For example, the port identifiers P1 and P2 sequentially indicate virtual port 1 and virtual port 2, the port identifiers P3 to P5 sequentially indicate AC port 1, AC port 2, and AC port 3, and the port identifiers P6 to P8 sequentially indicate EVPN Peer port 1, EVPN Peer port 2, and EVPN Peer port 3.

It is assumed that the first network device determines, from the routing and forwarding table of the VPLS instance shown in Table 2, that the address matching the destination address carried in the first packet is MAC address 1. It can be learned from Table 2 that a port identifier corresponding to MAC address 1 in the routing and forwarding table of the VPLS instance is P1, and a port type corresponding to the port identifier P1 is a virtual port type. In this case, the first network device determines virtual port 1 indicated by the port identifier P1 as the virtual port corresponding to the destination address carried in the first packet.

The foregoing description of this embodiment of this application uses an example in which the destination address carried in the first packet hits one forwarding entry in the routing and forwarding table of the VPLS instance (that is, one port identifier corresponding to the address that matches the destination address carried in the first packet exists in the routing and forwarding table of the VPLS instance). In an actual implementation process, the destination address carried in the first packet may hit at least two forwarding entries in the routing and forwarding table of the VPLS instance (that is, there are at least two port identifiers corresponding to the address matching the destination address carried in the first packet in the routing and forwarding table of the VPLS instance). Optionally, if the destination address carried in the first packet hits at least two forwarding entries in the routing and forwarding table of the VPLS instance, the first network device may determine, according to an active/standby protection policy, the virtual port corresponding to the destination address carried in the first packet. For example, if the destination address carried in the first packet hits at least two forwarding entries in the routing and forwarding table of the VPLS instance, the at least two forwarding entries may include a main forwarding entry and a backup forwarding entry, and the first network device determines, preferentially based on the main forwarding entry, the virtual port corresponding to the destination address carried in the first packet. If the main forwarding entry is unavailable, the first network device determines, based on the backup forwarding entry, the virtual port corresponding to the destination address carried in the first packet. That the main forwarding entry is unavailable includes but is not limited to: A port indicated by a port identifier in the main forwarding entry is faulty, another device or port connected to the port indicated by the port identifier in the main forwarding entry is faulty, or the like. Optionally, if the destination address carried in the first packet hits at least two forwarding entries in the routing and forwarding table of the VPLS instance, the first network device may alternatively determine, based on priorities of the forwarding entries, the virtual port corresponding to the destination address carried in the first packet. Optionally, ports that are in an active/standby relationship may be located in a same forwarding entry corresponding to a MAC address, and the active/standby relationship may be determined by using corresponding identification information. Details are not described herein again in this embodiment of this application.

It should be further noted that, in this embodiment of this application, the virtual port included in the VPLS instance may actually be understood as identification information that is stored in the VPLS instance and used to indicate a VPWS instance. In a possible natural implementation, the identification information may be stored in the routing and forwarding table of the VPLS instance, and is placed in a port information column of the routing and forwarding table of the VPLS instance together with a port such as an AC port or an EVPN peer port, so that the first network device searches the routing and forwarding table of the VPLS instance based on a destination address carried in a packet received by the VPLS instance, to determine whether the packet needs to be forwarded through the AC port or the EVPN peer port of the VPLS instance, or forwarded through the VPWS instance identified by the virtual port. Therefore, the identification information of the VPWS instance is referred to as a virtual port herein for ease of understanding. However, in other possible implementations, the identification information of the VPWS instance that is referred to as the virtual port may alternatively be stored in another possible location of the VPLS instance, and may be obtained by the VPLS instance in a feasible manner, to determine the VPWS instance interconnected with the VPLS instance. For example, the identification information of the VPWS instance that is referred to as a virtual port may alternatively be stored in another list independent of the routing and forwarding table of the VPLS instance, and information in the another list is associated with the port information column of the routing and forwarding table of the VPLS instance, to indicate that the information in the another list and information in the port information column of the routing and forwarding table are of a same or similar nature. The identification information of the VPWS instance and the virtual port may be considered to be equivalent concepts in a possible application scenario of this application.

S402: The first network device sends the first packet to a second VPWS instance in the second network device based on the virtual port, where the second VPWS instance in the second network device and the first VPWS instance in the first network device are VPWS instances used to bear a same service.

Optionally, after determining the virtual port corresponding to the destination address carried in the first packet, the first network device determines, based on the virtual port corresponding to the destination address, a routing and forwarding table of the first VPWS instance indicated by the virtual port, determines, based on the routing and forwarding table of the first VPWS instance, to send the first packet to the second VPWS instance in the second network device, and sends the first packet to the second VPWS instance in the second network device by using the first VPWS instance in the first network device. The second VPWS instance in the second network device and the first VPWS instance in the first network device are VPWS instances used to bear a same service.

Optionally, the first network device determines the second VPWS instance in the second network device based on the routing and forwarding table of the first VPWS instance, determines an egress port of the first packet from ports of the first VPWS instance by searching the routing and forwarding table of the first VPWS instance, and sends the first packet to the second VPWS instance in the second network device through the egress port of the first packet in the first VPWS instance. The egress port of the first packet in the first VPWS instance corresponds to the second VPWS instance in the second network device. Optionally, the routing and forwarding table of the first VPWS instance records a correspondence between a port identifier and association indication information. The port identifier is used to indicate a port that is in the first VPWS instance and that corresponds to corresponding association indication information. The association indication information is used to indicate a VPWS instance (for example, the second VPWS instance in the second network device) that is in a remote device (for example, the second network device) of the first network device and that corresponds to the first VPWS instance. For example, the association indication information may be an identifier of a VPN service borne in a VPWS instance in the remote device, or the association indication information may be an identifier of the VPWS instance. For example, in an MPLS network, the association indication information may be a VPN service label. In an SRv6 network, the association indication information may be an SID of a VPN service. In a possible implementation, an identifier of a VPN service may be used as an identifier of a VPWS instance. The first network device may determine, in the routing and forwarding table of the first VPWS instance, association indication information of a VPWS instance corresponding to the first VPWS instance, and determine a port indicated by a port identifier that is in the routing and forwarding table of the first VPWS instance and that corresponds to the association indication information as the egress port of the first packet.

Figure 6:
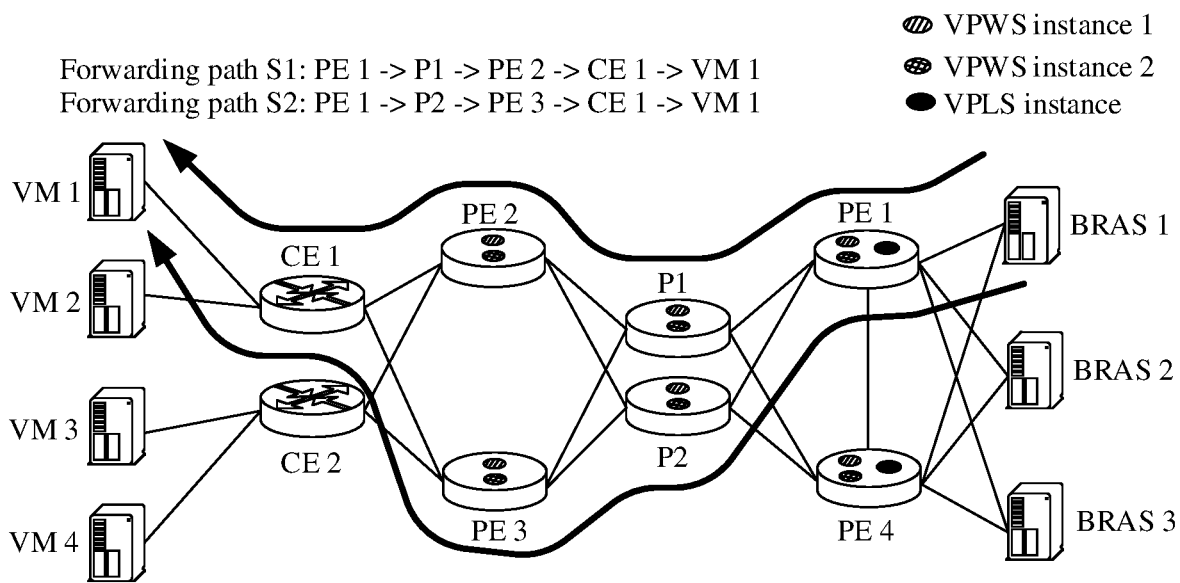
FIG. 6 is a schematic diagram of a packet transmission method according to an embodiment of this application.

For example, FIG. 6 is a schematic diagram of a packet transmission method according to an embodiment of this application. With reference to FIG. 5 and FIG. 6, an example in which the first network device is PE 1 is used. PE 1 determines that the virtual port corresponding to the destination address carried in the first packet is virtual port 1 in the VPLS instance. Virtual port 1 indicates VPWS instance 1 in PE 1 (that is, the first VPWS instance in the first network device). PE 1 may determine a routing and forwarding table of VPWS instance 1 in PE 1, and determine, based on the routing and forwarding table of VPWS instance 1 in PE 1, a port corresponding to VPWS instance 1 (that is, the second VPWS instance) in PE 2 as the egress port of the first packet. It is assumed that PE 1 determines, from VPWS instance 1 in PE 1, that the egress port of the first packet is EVPN Peer 11, and EVPN Peer 11 may correspond to VPWS instance 1 in PE 2. In this case, PE 1 sends the first packet to VPWS instance 1 in PE 2 through EVPN Peer 11 by using VPWS instance 1 in PE 1. Optionally, PE 1 first sends the first packet to, for example, VPWS instance 1 in P1 through EVPN Peer 11 by using VPWS instance 1 in PE 1, and after receiving the first packet, P1 sends the first packet to VPWS instance 1 in PE 2 by using VPWS instance 1 in P1. The first packet may carry association indication information of VPWS instance 1, for example, an identifier of a VPN service, to indicate PE 2 to forward the first packet to a CE device by using VPWS instance 1. In the foregoing example, PE 1 and PE 2 both bear VPWS instances 1. In specific implementation, content actually included in the corresponding VPWS instances borne in PE 1 and PE 2 is usually different due to localized implementation, but there is a correspondence between the VPWS instances because the VPWS instances bear a same service. For ease of understanding and description, the VPWS instances are both referred to as VPWS instance 1.

In conclusion, according to the packet transmission method provided in this embodiment of this application, the first network device is a device in the VPLS network, and the second network device is a device in the VPWS network. After receiving the first packet, the first network device determines, in the VPLS instance of the first network device based on the destination address carried in the first packet, the virtual port that is corresponding to the destination address and that is used to indicate the first VPWS instance of the first network device, and sends the first packet to the second VPWS instance of the second network device based on the virtual port. The second network device may forward the first packet by using the second VPWS instance. In this way, the first VPWS instance in the first network device may be used as a port member of the VPLS instance in the first network device. In this manner, the first VPWS instance is bound to the VPLS instance to implement interconnection between VPLS and VPWS in the first network device, so that the second network device can forward a packet by using a VPWS forwarding mechanism without learning a MAC address on a user side. This helps reduce pressure on the second network device to learn a MAC address, simplify a MAC entry of the second network device, and ensure forwarding performance of the entire network system.

In this embodiment of this application, each virtual port in the VPLS instance of the first network device may point to VPWS instances in at least two network devices, and the VPWS instances in the at least two network devices and a VPWS instance indicated by the virtual port in the first network device are used to bear a same service. The at least two network devices including the VPWS instances are located on at least two forwarding paths between the first network device and a destination device (for example, a device indicated by the destination address carried in the first packet). The at least two forwarding paths are mutually load sharing paths, or the at least two forwarding paths include a main (main) forwarding path and a backup (backup) forwarding path. For example, the routing and forwarding table of the first VPWS instance in the first network device is used to record a correspondence between two port identifiers corresponding to the two forwarding paths and the association indication information of the first VPWS instance, so that the first network device forwards a packet to a corresponding VPWS instance in the network devices on the two forwarding paths based on the correspondence.

For example, the VPLS instance of the first network device may be shown in FIG. 5. Virtual port 1 may point to VPWS instances 1 in at least two network devices, and VPWS instances 1 in the at least two network devices to which virtual port 1 points and VPWS instance 1 in the first network device are used to bear a same service. The at least two network devices including VPWS instances 1 are located on at least two forwarding paths between the first network device and the destination device. Similarly, virtual port 2 may point to VPWS instances 2 in at least two network devices, and VPWS instances 2 in the at least two network devices to which virtual port 2 points and VPWS instance 2 in the first network device are used to bear a same service. The at least two network devices including VPWS instances 2 are located on at least two forwarding paths between the first network device and the destination device. It should be noted that, for ease of description, the VPWS instance in the first network device and the VPWS instances in the at least two network devices to which the virtual port points are all described as VPWS instance 1 or VPWS instance 2. However, it may be understood that, in actual implementation, specific content included in the VPWS instance in the first network device and the VPWS instances in the at least two network devices to which the virtual port of the VPLS instance in the first network device points may actually be different from each other, but may be associated by using a specified relationship (for example, bearing a same type of service), and may be identified by same VPWS instance identification information, for example, be identi-fied by a same VPN service identifier, to implement forwarding of a service packet between VPWS instances that are associated and belong to different network devices.

In this embodiment of this application, if the at least two network devices including the VPWS instances to which the virtual port points are located on at least two forwarding paths between the first network device and the destination device (for example, the device indicated by the destination address carried in the first packet), the first network device may send the packet to the destination device through the at least two forwarding paths according to a load sharing policy or an active/standby protection policy. For example, if the at least two forwarding paths are mutually load sharing paths, the first network device may send the packet to the destination device through the at least two forwarding paths according to the equal cost multi path (equal cost multi path, ECMP) policy. If the at least two forwarding paths include a main forwarding path and a backup forwarding path, the first network device preferentially sends the packet to the destination device through the main forwarding path. When the main forwarding path is faulty, the first network device sends the packet to the destination device through the backup forwarding path. The following describes the packet transmission method provided in this application by using an example in which the first network device sends a packet to the destination device through the at least two forwarding paths.

Figure 7:
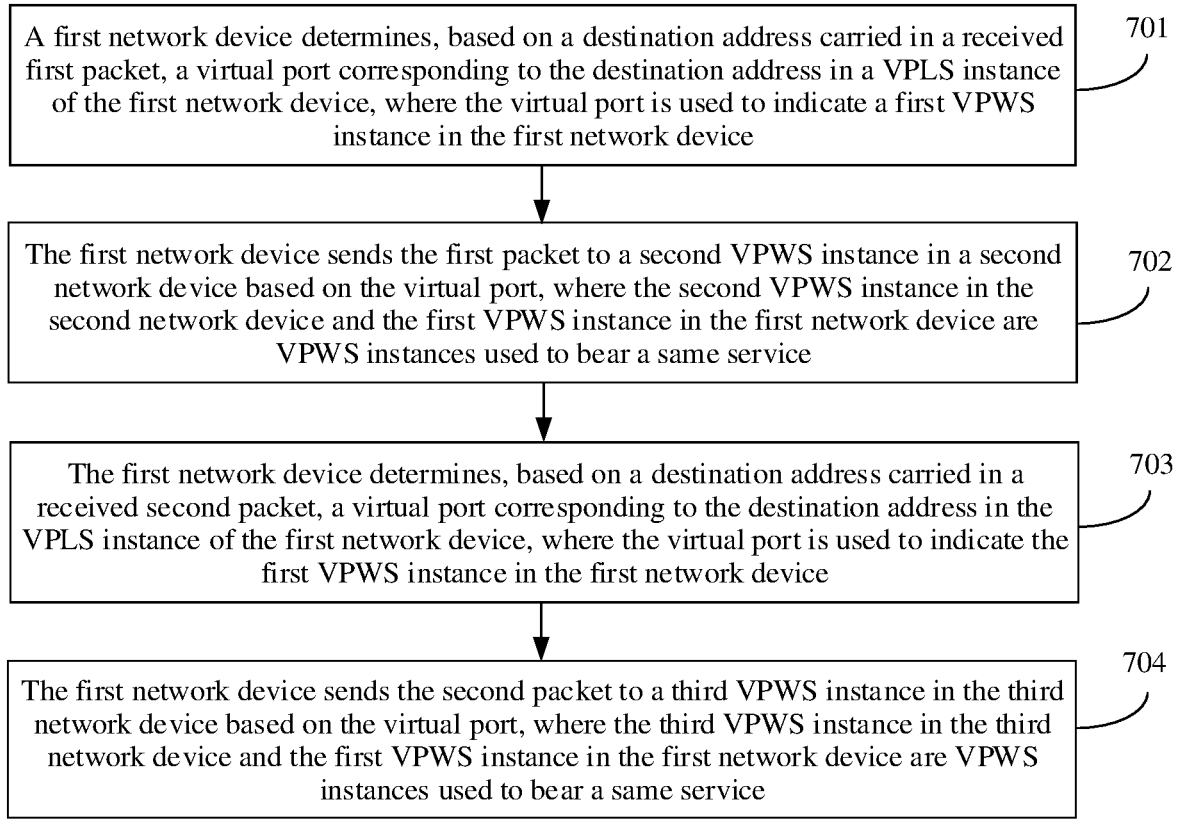
FIG. 7 is a flowchart of another packet transmission method according to an embodiment of this application.

For example, FIG. 7 is a flowchart of another packet transmission method according to an embodiment of this application. The packet transmission method may be applied to a system including a first network device, a second network device, and a third network device. The first network device is a device in a VPLS network. Both the second network device and the third network device are devices in a VPWS network, and both the second network device and the third network device include VPWS instances to which a same virtual port in a VPLS instance of the first network device points. For example, as shown in FIG. 1 to FIG. 3, the first network device may be PE 1, the second network device may be PE 2, and the third network device may be PE 3. As shown in FIG. 7, the method may include the following steps.

S701: The first network device determines, based on a destination address carried in a received first packet, a virtual port corresponding to the destination address in the VPLS instance of the first network device, where the virtual port is used to indicate a first VPWS instance in the first network device.

S702: The first network device sends the first packet to a second VPWS instance in the second network device based on the virtual port, where the second VPWS instance in the second network device and the first VPWS instance in the first network device are VPWS instances used to bear a same service.

For implementation processes of S701 and S702, refer to the embodiment shown in FIG. 4. Details are not described herein again.

S703: The first network device determines, based on a destination address carried in a received second packet, a virtual port corresponding to the destination address in the VPLS instance of the first network device, where the virtual port is used to indicate the first VPWS instance in the first network device.

After receiving the second packet, the first network device may parse the second packet, to determine, from the second packet, the destination address carried in the second packet, and then determine, in the VPLS instance of the first network device based on the destination address carried in the second packet, the virtual port corresponding to the destination address. The virtual port is used to indicate the first VPWS instance in the first network device, and the second packet may come from a broadband access device, for example, a BRAS.

For a process in which the first network device determines, in the VPLS instance of the first network device, the virtual port corresponding to the destination address carried in the second packet, refer to S401. Details are not described herein again in this embodiment of this application. It should be noted that, in this embodiment of this application, the destination address carried in the second packet is the same as the destination address carried in the first packet. Therefore, the virtual port that is corresponding to the destination address carried in the second packet and that is determined by the first network device may be the same as the virtual port that is corresponding to the destination address carried in the first packet and that is determined by the first network device in S701. Optionally, the virtual port that is corresponding to the destination address carried in the second packet and that is determined by the first network device may be different from the virtual port that is corresponding to the destination address carried in the first packet and that is determined by the first network device in S701. This is not limited in this embodiment of this application. In this embodiment of this application, an example in which the virtual port corresponding to the destination address carried in the second packet is the same as the virtual port corresponding to the destination address carried in the first packet in S701 is used for description.

S704: The first network device sends the second packet to a third VPWS instance in the third network device based on the virtual port, where the third VPWS instance in the third network device and the first VPWS instance in the first network device are VPWS instances used to bear a same service.

The third network device may be a device in the VPWS network, and the third VPWS instance is configured in the third network device. The third VPWS instance in the third network device and the first VPWS instance in the first network device are VPWS instances used to bear a same service. As described above, the second VPWS instance in the second network device and the first VPWS instance in the first network device are also VPWS instances used to bear a same service. Therefore, the first VPWS instance in the first network device, the second VPWS instance in the second network device, and the third VPWS instance in the third network device are VPWS instances used to bear the same service.

In this embodiment of this application, both the second VPWS instance in the second network device and the third VPWS instance in the third network device may be VPWS instances to which the virtual port corresponding to the destination address carried in the first packet (or the destination address carried in the second packet) points. The second network device and the third network device may be located on two forwarding paths between the first network device and a destination device (for example, a device indicated by the destination address carried in the first packet or the second packet). After the foregoing S702 is performed, the first network device may send the second packet to the third VPWS instance in the third network device according to a load sharing policy or an active/standby protection policy based on the virtual port corresponding to the destination address carried in the second packet. That is, the first network device may send the first packet and the second packet to the destination device through the two forwarding paths between the first network device and the destination device according to the load sharing policy or the active/standby protection policy.

Optionally, the two forwarding paths between the first network device and the destination device are mutually load sharing paths, and the first network device sends the second packet to the third VPWS instance in the third network device according to the load sharing policy based on the virtual port corresponding to the destination address carried in the second packet. For example, the first network device sends the second packet to the third VPWS instance in the third network device according to the ECMP policy in a per-flow load sharing manner or per-packet load sharing manner based on the virtual port corresponding to the destination address carried in the second packet. For the per-flow load sharing manner, the second packet and the first packet may be packets in different service flows of a same service. For example, the second packet and the first packet may be packets in two adjacent service flows of the same service. For the per-packet load sharing manner, the second packet and the first packet are packets in a same service flow of a same service. For example, the second packet and the first packet are two adjacent packets in the service flow. This is not limited in this embodiment of this application.

Optionally, the two forwarding paths between the first network device and the destination device include a main forwarding path and a backup forwarding path. The second network device may be located on the main forwarding path, and the third network device may be located on the backup forwarding path. The first network device sends the second packet to the third VPWS instance in the third network device according to the active/standby protection policy based on the virtual port corresponding to the destination address carried in the second packet. In the active/standby protection manner, the first network device preferentially sends a packet to the destination device through the main forwarding path, and if the main forwarding path is faulty, the first network device sends the packet to the destination device through the backup forwarding path. Therefore, in this embodiment of this application, the first network device may determine that the main forwarding path is faulty, and then send the second packet to the third VPWS instance in the third network device based on the main forwarding path fault and the virtual port corresponding to the destination address carried in the second packet. That the main forwarding path is faulty may include: At least one device on the main forwarding path is faulty, or a port of at least one device on the main forwarding path is faulty.

With reference to FIG. 5 and FIG. 6, an example in which the first network device is PE 1 and the destination device is VM 1 is used. The destination addresses carried in the first packet and the second packet are both corresponding to virtual port 1 of the VPLS instance of PE 1. Virtual port 1 is used to indicate VPWS instance 1 in PE 1, and virtual port 1 points to VPWS instance 1 in PE 2 and VPWS instance 1 in PE 3. VPWS instance 1 in PE 1, VPWS instance 1 in PE 2, and VPWS instance 1 in PE 3 are used to bear a same service. The forwarding path S1 and the forwarding path S2 are two forwarding paths between PE 1 and VM 1, PE 2 is located on the forwarding path S1, and PE 3 is located on the forwarding path S2. Optionally, the forwarding path S1 and the forwarding path S2 are mutually load sharing paths. PE 1 may use a per-flow load sharing manner or per-packet load sharing manner to send the first packet to VPWS instance 1 in PE 2 based on virtual port 1 corresponding to the destination address carried in the first packet, and send the second packet to VPWS instance 1 in PE 3 based on virtual port 1 corresponding to the destination address carried in the second packet. Alternatively, the forwarding path S1 and the forwarding path S2 may include a main forwarding path and a backup forwarding path. For example, the forwarding path S1 is the main forwarding path, and the forwarding path S2 is the backup forwarding path. PE 1 may send the first packet to VPWS instance 1 in PE 2 based on virtual port 1 corresponding to the destination address carried in the first packet, then PE 1 determines that the forwarding path S1 is faulty, and PE 1 sends the second packet to VPWS instance 1 in PE 3 based on virtual port 1 corresponding to the destination address carried in the second packet.

Optionally, that the first network device sends the second packet to the third VPWS instance in the third network device based on the virtual port corresponding to the destination address carried in the second packet may include: The first network device determines, based on the virtual port corresponding to the destination address carried in the second packet, a routing and forwarding table of the first VPWS instance indicated by the virtual port, determines, based on the routing and forwarding table of the first VPWS instance, to send the second packet to the third VPWS instance in the third network device, and sends the second packet to the third VPWS instance in the third network device by using the first VPWS instance in the first network device.

Optionally, the first network device determines the third VPWS instance in the third network device based on the routing and forwarding table of the first VPWS instance, determines an egress port of the second packet from ports of the first VPWS instance by searching the routing and forwarding table of the first VPWS instance, and sends the second packet to the third VPWS instance in the third network device through the egress port of the second packet in the first VPWS instance. The egress port of the second packet in the first VPWS instance corresponds to the third VPWS instance in the third network device. Optionally, the routing and forwarding table of the first VPWS instance records a correspondence between a port identifier and association indication information of the third VPWS instance, and the first network device may determine a port indicated by the port identifier as the egress port of the second packet, so as to send the second packet to the third VPWS instance in the third network device.

With reference to FIG. 5 and FIG. 6, an example in which the first network device is PE 1 is used. PE 1 determines that the virtual port corresponding to the destination address carried in the second packet is virtual port 1 in the VPLS instance, and virtual port 1 indicates VPWS instance 1 in PE 1 (that is, the first VPWS instance in the first network device). PE 1 may determine a routing and forwarding table of VPWS instance 1 in PE 1, determine, based on the routing and forwarding table of VPWS instance 1 in PE 1, association indication information corresponding to VPWS instance 1 (that is, the third VPWS instance) in PE 3, and determine a port that is in the routing and forwarding table of VPWS instance 1 and that corresponds to the association indication information as the egress port of the second packet. It is assumed that PE 1 determines, from VPWS instance 1 in PE 1, that the egress port of the second packet is EVPN Peer 12, and EVPN Peer 12 may correspond to VPWS instance 1 in PE 3. In this case, PE 1 sends the second packet to VPWS instance 1 in PE 3 through EVPN Peer 12 by using VPWS instance 1 in PE 1. Optionally, PE 1 first sends the second packet to, for example, VPWS instance 1 in P2 through EVPN Peer 12 by using VPWS instance 1 in PE 1, and after receiving the second packet, P2 sends the second packet to VPWS instance 1 in PE 3 by using VPWS instance 1 in P2.

In conclusion, according to the packet transmission method provided in this embodiment of this application, the first network device is a device in the VPLS network, the second network device and the third network device are both devices in the VPWS network. After receiving the first packet, the first network device determines, in the VPLS instance of the first network device based on the destination address carried in the first packet, the virtual port that is corresponding to the destination address and that is used to indicate the first VPWS instance of the first network device, and sends the first packet to the second VPWS instance in the second network device based on the virtual port; and the second network device may forward the first packet by using the second VPWS instance. In addition, after receiving the second packet, the first network device determines, in the VPLS instance of the first network device based on the destination address carried in the second packet, the virtual port that is corresponding to the destination address and that is used to indicate the first VPWS instance in the first network device, and sends the second packet to the third VPWS instance in the third network device based on the virtual port; and the third network device may forward the first packet by using the third VPWS instance. In this way, the first VPWS instance in the first network device may be used as a port member of the VPLS instance in the first network device. In this manner, the first VPWS instance and the VPLS instance are bound to implement interconnection between VPLS and VPWS in the first network device, so that both the second network device and the third network device can perform packet forwarding by using a VPWS forwarding mechanism, and neither the second network device nor the third network device needs to learn a MAC address. This helps reduce pressure on the second network device and the third network device to learn a MAC address, simplify MAC entries of the second network device and the third network device, and ensure forwarding performance of the second network device and the third network device. In addition, the first network device can forward packets to a same destination device through different forwarding paths, to implement load balancing or active/standby protection of the forwarding paths.

As described in the foregoing implementation environment, an EVPN may include a plurality of broadband access PE devices, and the plurality of broadband access PE devices may be connected to each other, so as to implement dual-homing protection for the broadband access PE devices. For example, when a forwarding path between a broadband access PE device in the plurality of broadband access PE devices and a destination device is faulty, and consequently the broadband access PE device cannot send a packet to the destination device through the forwarding path, the broadband access PE device may forward the packet to a broadband access PE device connected to the broadband access PE device, and the broadband access PE device connected to the broadband access PE device forwards the packet to the destination device.

In this embodiment of this application, the first network device may be a broadband access PE device in the EVPN, and the VPLS instance of the first network device may include at least one EVPN Peer port connected to another broadband access PE device. When a forwarding path between the first network device and the destination device (for example, the device indicated by the destination address carried in the first packet) is faulty, the first network device may forward, by using the VPLS instance of the first network device, a packet to the broadband access PE device connected to the first network device through the EVPN Peer port of the VPLS instance. The broadband access PE device connected to the first network device forwards the packet to the destination device.

Figure 8:
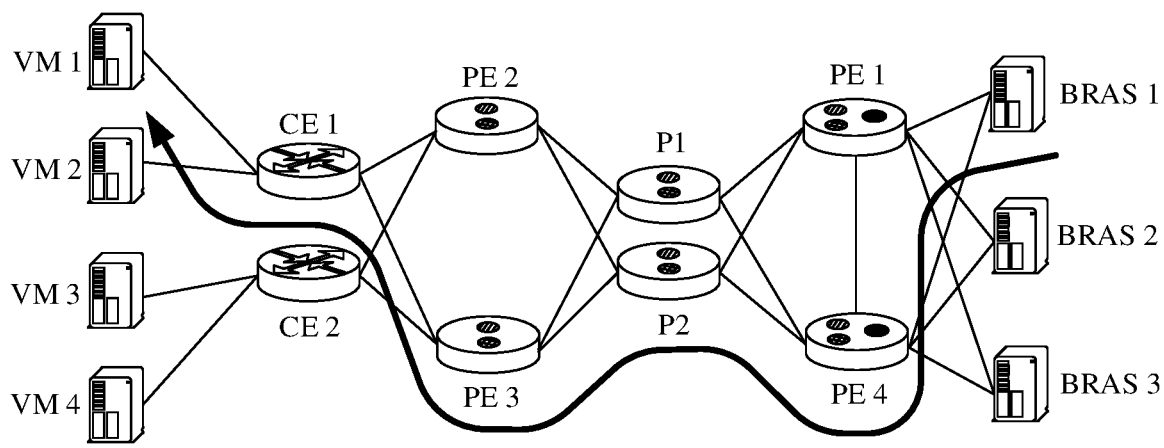
FIG. 8 is a schematic diagram of another packet transmission method according to an embodiment of this application.

For example, FIG. 8 is a schematic diagram of another packet transmission method according to an embodiment of this application. An example in which the first network device is PE 1 is used. Both PE 1 and PE 4 may be broadband access PE devices. A schematic diagram of a relationship between the VPLS instance and VPWS instances in PE 1 is shown in FIG. 5. EVPN Peer 3 in the VPLS instance of PE 1 may be connected to PE 4. With reference to FIG. 6 and FIG. 8, when PE 1 needs to send a packet to VM 1, if both the forwarding path S1 and the forwarding path S2 between PE 1 and VM 1 are faulty, PE 1 may forward the packet to PE 4 through EVPN Peer 3 in the VPLS instance of PE 1, and PE 4 forwards the packet to P2 by using VPWS instance 1 in PE 4. Finally, the packet is forwarded to VM 1 along a forwarding path S3.

Optionally, in the foregoing embodiments, before the first network device determines, in the VPLS instance of the first network device based on the destination address carried in the received first packet, the virtual port corresponding to the destination address, the method further includes: The first network device receives, by using the first VPWS instance in the first network device, a third packet sent by the second network device; and the first network device generates a forwarding entry in the routing and forwarding table of the VPLS instance based on a source address carried in the third packet and the first VPWS instance. A destination address in the forwarding entry is the source address carried in the third packet, a port identifier in the forwarding entry is used to indicate a virtual port in the VPLS instance, and the virtual port is used to indicate the first VPWS instance in the first network device. The following describes a process in which the first network device generates the forwarding entry.

For example, the second network device may send the third packet to the first VPWS instance in the first network device by using the second VPWS instance in the second network device, and the first network device receives the third packet by using the first VPWS instance in the first network device. Then the first network device parses the third packet to determine, from the third packet, the source address carried in the third packet, determines the virtual port corresponding to the first VPWS instance in the VPLS instance of the first network device, and generates the forwarding entry in the routing and forwarding table of the VPLS instance based on the source address carried in the third packet and the port identifier of the virtual port corresponding to the first VPWS instance in the VPLS instance of the first network device.

Optionally, the port identifier of the virtual port may indicate only the virtual port, or the port identifier of the virtual port may indicate the virtual port and a type of the virtual port. In this case, that the first network device generates the forwarding entry in the routing and forwarding table of the VPLS instance based on the source address carried in the third packet and the port identifier of the virtual port may include: If the port identifier of the virtual port indicates the virtual port and the type of the virtual port, the first network device generates the forwarding entry in the routing and forwarding table of the VPLS instance based on the source address carried in the third packet and the port identifier of the virtual port; or if the port identifier of the virtual port indicates only the virtual port, the first network device may further determine the type of the virtual port, and generate the forwarding entry in the routing and forwarding table of the VPLS instance based on the source address carried in the third packet, the port identifier of the virtual port, and the type of the virtual port.

For example, the VPLS instance in the first network device is shown in FIG. 5, the source address carried in the third packet may be MAC address 1, the virtual port corresponding to the first VPWS instance in the first network device may be virtual port 1 in the VPLS instance, and the first network device determines that a port identifier of virtual port 1 is V-P1. Because the port identifier V-P1 indicates virtual port 1 and a type of virtual port 1, the first network device generates the forwarding entry in the routing and forwarding table of the VPLS instance based on the source address (that is, MAC address 1) carried in the third packet and the port identifier V-P1 of virtual port 1. The forwarding entry may be shown as the forwarding entry in the first row in Table 1.

For another example, the VPLS instance in the first network device is shown in FIG. 5, the source address carried in the third packet may be MAC address 1, the virtual port corresponding to the first VPWS instance in the first network device may be virtual port 1 in the VPLS instance, and the first network device determines that a port identifier of virtual port 1 is P1. Because the port identifier P1 indicates only virtual port 1, the first network device may determine a type of virtual port 1, and generate the forwarding entry in the routing and forwarding table of the VPLS instance based on the source address (that is, MAC address 1) carried in the third packet, the port identifier P1 of virtual port 1, and the type of virtual port 1. The forwarding entry may be shown as the forwarding entry in the first row in Table 2.

In this embodiment of this application, the port identifier that is in the routing and forwarding table of the VPLS instance and that is used to indicate the virtual port may be identification information of the VPWS instance indicated by the virtual port, or other attribute information that is related to the VPWS instance indicated by the virtual port and that can enable the VPLS instance to determine the VPWS instance, for example, may be information about a port in the VPWS instance. For ease of understanding, the information is referred to as port identifier in this embodiment of this application. Optionally, after receiving the third packet by using the first VPWS instance in the first network device, the first network device generates the forwarding entry in the routing and forwarding table of the VPLS instance based on the source address carried in the third packet and the identification information of the first VPWS instance (or other attribute information that enables the VPLS instance to determine the VPWS instance). This is not limited in this embodiment of this application.

The foregoing embodiments are described by using an example in which the VPLS instance of the first network device includes a port (for example, a virtual port) corresponding to a destination address carried in a packet (for example, the first packet and the second packet). In an actual implementation process, the VPLS instance of the first network device may not include the port corresponding to the destination address carried in the packet. In this case, the first network device may broadcast the packet. In this case, the packet transmission method provided in this application may be further implemented by using the following embodiment.

Figure 9:
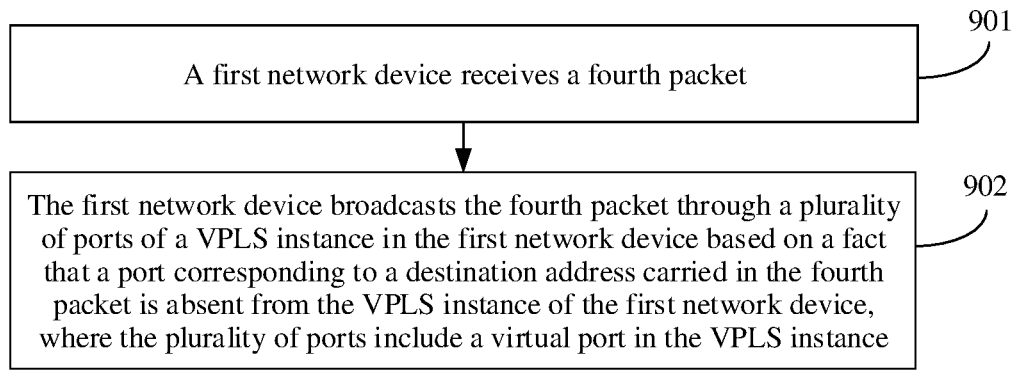
FIG. 9 is a flowchart of still another packet transmission method according to an embodiment of this application.

For example, FIG. 9 is a flowchart of still another packet transmission method according to an embodiment of this application. The packet transmission method may be applied to a first network device. For example, as shown in FIG. 1 to FIG. 3, the first network device may be PE 1. As shown in FIG. 9, the method may include the following steps.

S901: The first network device receives a fourth packet.

Optionally, the fourth packet may come from a broadband access device, for example, a BRAS. At least one VPLS instance may be configured in the first network device, and the first network device may receive the fourth packet by using the VPLS instance in the first network device. For example, as shown in FIG. 6 and FIG. 8, the first network device may be PE 1, the fourth packet may come from BRAS 1, and PE 1 receives the fourth packet by using the VPLS instance in PE 1.

S902: The first network device broadcasts the fourth packet through a plurality of ports of the VPLS instance in the first network device based on a fact that a port corresponding to a destination address carried in the fourth packet is absent from the VPLS instance of the first network device, where the plurality of ports include a virtual port in the VPLS instance.

After receiving the fourth packet, the first network device may parse the fourth packet, to determine, from the fourth packet, the destination address carried in the fourth packet, and then determine, in the VPLS instance of the first network device based on the destination address carried in the fourth packet, the port corresponding to the destination address. If the port corresponding to the destination address carried in the fourth packet is absent from the VPLS instance of the first network device, the first network device broadcasts the fourth packet through the plurality of ports of the VPLS instance in the first network device. The plurality of ports include the virtual port in the VPLS instance. Optionally, the plurality of ports may further include an EVPN Peer port and/or an AC port in the VPLS instance. For example, if the VPLS instance of the first network device does not include the port corresponding to the destination address carried in the fourth packet, the first network device broadcasts the fourth packet through all ports of the VPLS instance of the first network device (including virtual ports, AC ports, and EVPN Peer ports), or the first network device broadcasts the fourth packet through all virtual ports of the VPLS instance of the first network device. This is not limited in this embodiment of this application.

Optionally, the first network device may search a routing and forwarding table of the VPLS instance of the first network device based on the destination address carried in the fourth packet, to determine whether an address that matches (for example, is the same as) the destination address carried in the fourth packet exists in the routing and forwarding table of the VPLS instance. If the address matching the destination address carried in the fourth packet exists in the routing and forwarding table of the VPLS instance, the first network device determines that the port corresponding to the destination address carried in the fourth packet exists in the VPLS instance of the first network device. If the address matching the destination address carried in the fourth packet does not exist in the routing and forwarding table of the VPLS instance, the first network device determines that the port corresponding to the destination address carried in the fourth packet does not exist in the VPLS instance of the first network device. In this embodiment of this application, an example in which the address matching the destination address carried in the fourth packet does not exist in the routing and forwarding table of the VPLS instance is used for description. In this case, the port corresponding to the destination address carried in the fourth packet does not exist in the VPLS instance of the first network device, and the first network device broadcasts the fourth packet through the plurality of ports of the VPLS instance of the first network device.

For example, the destination address carried in the fourth packet is MAC address 9, and the routing and forwarding table of the VPLS instance of the first network device may be shown in Table 1 or Table 2. The first network device searches the routing and forwarding table shown in Table 1 or Table 2 based on MAC address 9 carried in the fourth packet. Because no address matching (for example, being the same as) MAC address 9 exists in the routing and forwarding table shown in Table 1 or Table 2, the first network device determines that the port corresponding to the destination address carried in the fourth packet does not exist in the VPLS instance of the first network device. For example, the VPLS instance of the first network device is shown in FIG. 5. In this case, the first network device may broadcast the fourth packet through a plurality of ports in AC 1, AC 2, AC 3, EVPN Peer 1, EVPN Peer 2, EVPN Peer 3, virtual port 1, and virtual port 2 in the VPLS instance. For example, the first network device broadcasts the fourth packet through virtual port 1 and virtual port 2 in the VPLS instance. That the first network device broadcasts the fourth packet through virtual port 1 and virtual port 2 in the VPLS instance may be: The first network device broadcasts the fourth packet through a plurality of ports of VPWS instance 1 indicated by virtual port 1 and a plurality of ports of VPWS instance 2 indicated by virtual port 2.

The packet transmission method provided in this embodiment and the packet transmission methods provided in the foregoing embodiments may be used together. For example, in actual application, the method in the embodiment shown in FIG. 4 or FIG. 7 may be performed before or after this embodiment. Alternatively, the method provided in the embodiment shown in FIG. 9 and the method provided in the embodiment shown in FIG. 7 may be alternately performed. For example, the first network device first performs S701 and S702, then performs the embodiment shown in FIG. 9 after S702 ends, and continues to perform S703 and S704 after performing the embodiment shown in FIG. 9. This is not limited in the embodiments of this application.

In conclusion, according to the packet transmission method provided in this embodiment of this application, the first network device is a device in a VPLS network. After receiving the fourth packet, the first network device determines, in the VPLS instance of the first network device, the port corresponding to the destination address based on the destination address carried in the fourth packet. If the port corresponding to the destination address carried in the fourth packet is absent from the VPLS instance of the first network device, the first network device broadcasts the fourth packet through a plurality of ports of the VPLS instance. Therefore, the packet transmission solution provided in this embodiment of this application is applicable to a packet broadcast scenario.

The foregoing describes the method embodiments of this application. The following describes apparatus embodiments of this application. The apparatus in this application may be configured to perform the method in this application. For details not disclosed in the apparatus embodiments of this application, refer to the method embodiments of this application.

Figure 10:
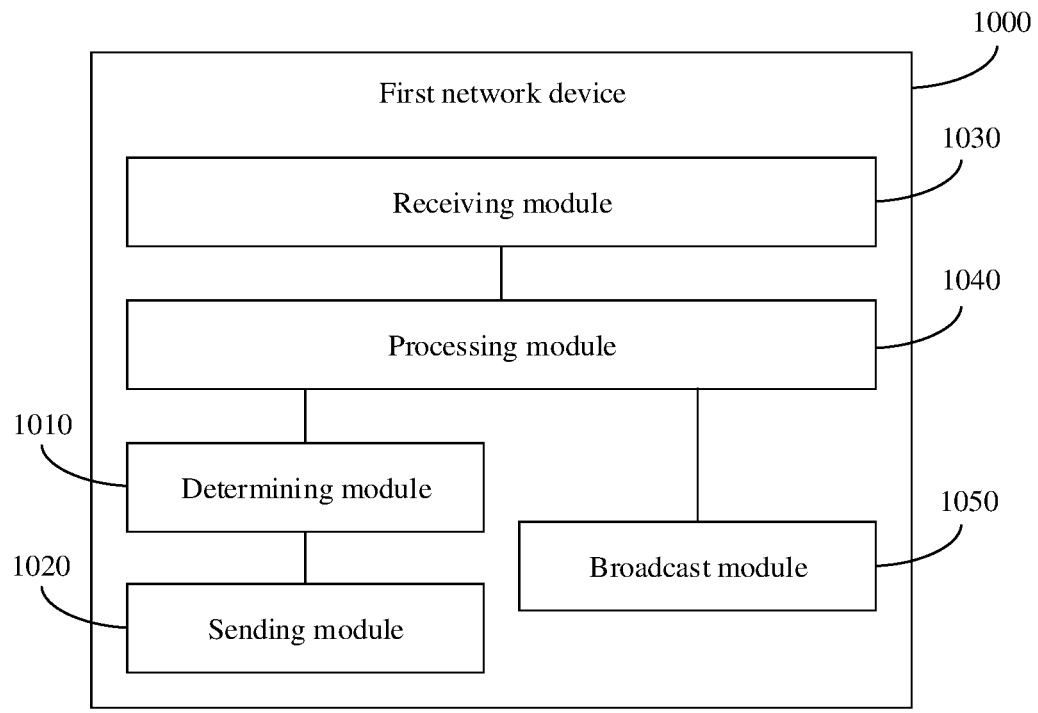
FIG. 10 is a schematic diagram of a logical structure of a first network device according to an embodiment of this application.

FIG. 10 is a schematic diagram of a logical structure of a first network device 1000 according to an embodiment of this application. The first network device 1000 is in a packet transmission system, the packet transmission system further includes a second network device, the first network device 1000 is a device in a VPLS network, and the second network device is a device in a VPWS network. Refer to FIG. 10. The first network device 1000 may include but is not limited to a determining module 1010 and a sending module 1020.

The determining module 1010 is configured to determine, based on a destination address carried in a received first packet, a virtual port corresponding to the destination address in the VPLS instance of the first network device 1000, where the virtual port is used to indicate a first VPWS instance in the first network device 1000. For function implementation of the determining module 1010, refer to related descriptions of S401, S701, and S901.

The sending module 1020 is configured to send the first packet to a second VPWS instance in the second network device based on the virtual port, where the second VPWS instance in the second network device and the first VPWS instance in the first network device 1000 are VPWS instances used to bear a same service. For function implementation of the sending module 1020, refer to related descriptions of S402, S702, and S902.

Optionally, the sending module 1020 is specifically configured to: determine a routing and forwarding table of the first VPWS instance based on the virtual port; and determine, based on the routing and forwarding table of the first VPWS instance, to send the first packet to the second VPWS instance in the second network device.

Optionally, the packet transmission system further includes a third network device, and the third network device is a device in the VPWS network.

The determining module 1010 is further configured to determine the virtual port based on the destination address carried in a received second packet. For function implementation of the determining module 1010, further refer to related descriptions of S703 and S903.

The sending module 1020 is further configured to send the second packet to a third VPWS instance in the third network device based on the virtual port, where the third VPWS instance in the third network device and the first VPWS instance in the first network device 1000 are VPWS instances used to bear a same service. For function implementation of the sending module 1020, further refer to related descriptions of S704 and S904.

Optionally, the determining module 1010 is further configured to determine that a main forwarding path used to bear the service between the first network device 1000 and a device indicated by the destination address is faulty, where the second network device is located on the main forwarding path.

The sending module 1020 is specifically configured to send the second packet to the third VPWS instance in the third network device based on the main forwarding path fault and the virtual port, where the third network device is located on a backup forwarding path used to bear the service between the first network device 1000 and the device indicated by the destination address.

Optionally, the virtual port points to at least two VPWS instances that are of at least two network devices and that are used to bear the service, the at least two network devices including the VPWS instances are located on at least two forwarding paths between the first network device 1000 and the device indicated by the destination address, and the at least two forwarding paths are mutually load sharing paths, or the at least two forwarding paths include a main forwarding path and a backup forwarding path.

Optionally, the VPLS instance includes a port of a virtual port type.

Optionally, the VPLS instance further includes at least one of a port of an AC type and a port of an EVPN Peer type.

Optionally, the determining module 1010 is specifically configured to determine the virtual port corresponding to the destination address based on a fact that a port corresponding to the destination address in a routing and forwarding table of the VPLS instance of the first network device 1000 is the virtual port.

Optionally, the determining module 1010 is specifically configured to: determine the virtual port based on the destination address and a port identifier that are in the routing and forwarding table of the VPLS instance, where the port identifier is used to indicate the virtual port corresponding to the destination address in the VPLS instance and a type of the virtual port; or determine the virtual port based on the destination address, a port identifier, and a port type that are in the routing and forwarding table of the VPLS instance, where the port identifier indicates a port corresponding to the destination address in the VPLS instance, and the port type indicates that a type of the port is a virtual port type.

Optionally, continue to refer to FIG. 10. The first network device 1000 further includes a receiving module 1030 and a processing module 1040.

The receiving module 1030 is configured to: before the determining module 1010 determines, based on the destination address carried in the received first packet, the virtual port corresponding to the destination address in the VPLS instance of the first network device 1000, receive, by using the first VPWS instance in the first network device 1000, a third packet sent by the second network device. For function implementation of the receiving module 1030, refer to related descriptions of S905.

The processing module 1040 is configured to generate a forwarding entry in the routing and forwarding table of the VPLS instance based on a source address carried in the third packet and the first VPWS instance, where a destination address in the forwarding entry is the source address carried in the third packet, a port identifier in the forwarding entry is used to indicate the virtual port, and the virtual port is used to indicate the first VPWS instance in the first network device 1000. For function implementation of the processing module 1040, refer to related descriptions of S906.

Optionally, the receiving module 1030 is further configured to receive a fourth packet.

Continue to refer to FIG. 10. The first network device 1000 further includes: a broadcast module 1050, configured to broadcast the fourth packet through a plurality of ports of the VPLS instance based on a fact that a port corresponding to a destination address carried in the fourth packet is absent from the VPLS instance of the first network device 1000, where the plurality of ports include the virtual port.

In conclusion, according to the technical solutions provided in this embodiment of this application, the first network device is a device in the VPLS network, and the second network device is a device in the VPWS network. After receiving the first packet, the first network device determines, in the VPLS instance of the first network device based on the destination address carried in the first packet, the virtual port that is corresponding to the destination address and that is used to indicate the first VPWS instance of the first network device, and sends the first packet to the second VPWS instance of the second network device based on the virtual port. The second network device may forward the first packet by using the second VPWS instance. In this way, the first VPWS instance in the first network device may be used as a port member of the VPLS instance in the first network device. In this manner, the first VPWS instance is bound to the VPLS instance to implement interconnection between VPLS and VPWS in the first network device, so that the second network device can forward a packet by using a VPWS forwarding mechanism without learning a MAC address. This helps reduce pressure on the second network device to learn a MAC address, simplify a MAC entry of the second network device, and ensure forwarding performance of the second network device.

It should be understood that the network device in this embodiment of this application may further be implemented by using an application-specific integrated circuit (ASIC) or a programmable logic device (PLD). The PLD may be a complex programmable logic device (CPLD), a field programmable gate array (FPGA), a generic array logic (GAL), or any combination thereof. Alternatively, the packet transmission method provided in the foregoing method embodiment may be implemented by using software. When the packet transmission method provided in the foregoing method embodiment is implemented by using software, modules in the network device may be software modules.

Figure 11:
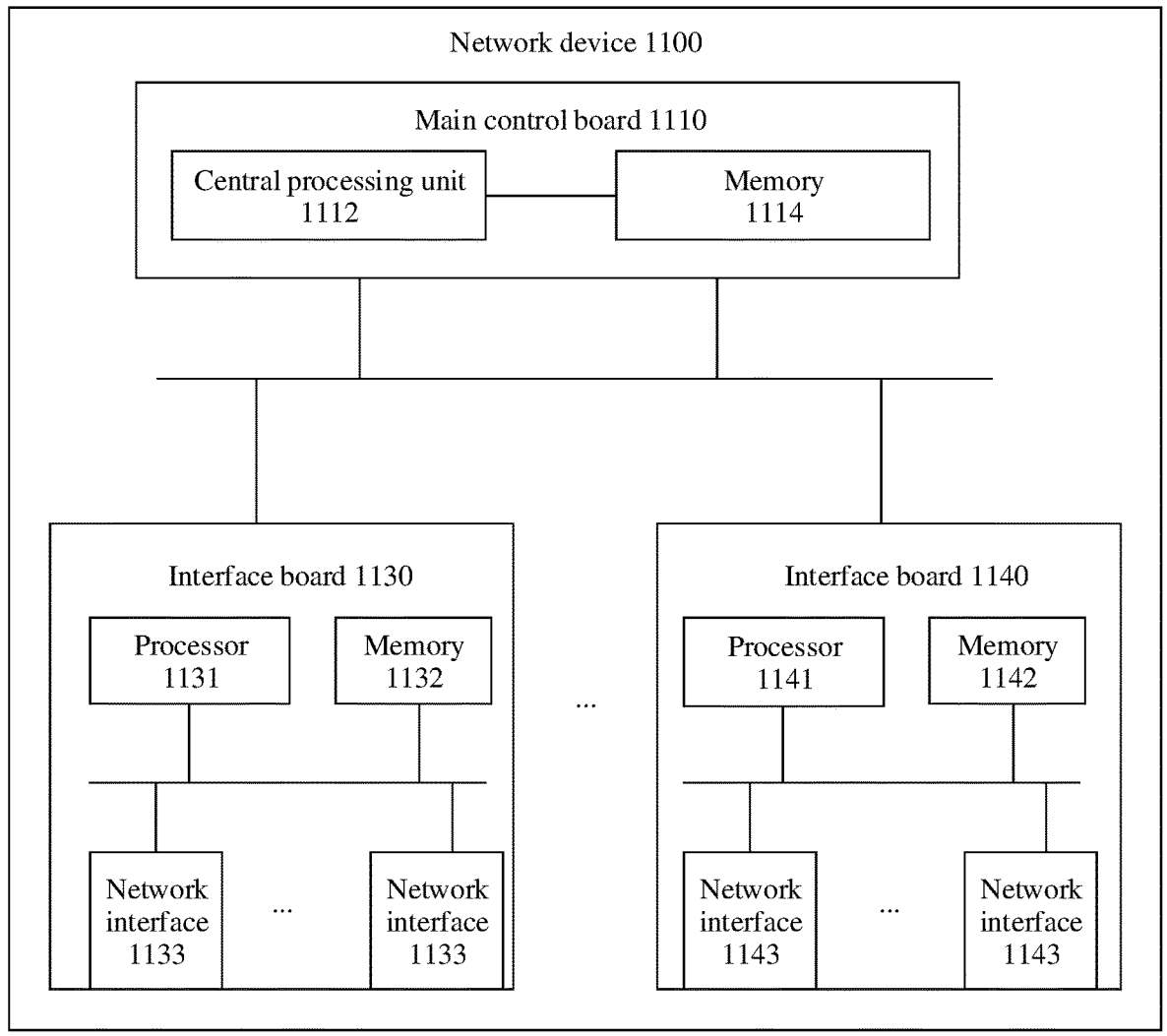
FIG. 11 is a schematic diagram of a hardware structure of a network device according to an embodiment of this application.

FIG. 11 is a schematic diagram of a hardware structure of a network device 1100 according to an embodiment of this application. The network device 1100 may be the first network device in the foregoing embodiment, and the network device 1100 may be a PE device. As shown in FIG. 11, the network device 1100 includes a main control board 1110, an interface board 1130, and an interface board 1140. When there are a plurality of interface boards, a switching board (not shown in FIG. 11) may be included. The switching board is configured to implement data exchange between interface boards (the interface board is also referred to as a line card or a service board).

The main control board 1110 is configured to complete functions such as system management, device maintenance, and protocol processing. The interface board 1130 and the interface board 1140 are configured to provide various service interfaces (for example, a POS interface, a GE interface, and an ATM interface) and forward packets. The main control board 1110 mainly includes three types of function units: a system management and control unit, a system clock unit, and a system maintenance unit. The main control board 1110, the interface board 1130, and the interface board 1140 are connected to a system backboard by using a system bus to implement interworking. The interface board 1130 includes one or more processors 1131. The processor 1131 is configured to control and manage the interface board 1130 and communicate with a central processing unit 1112 on the main control board 1110. A memory 1132 on the interface board 1130 is configured to store a routing and forwarding table, for example, a routing and forwarding table of a VPLS instance and/or a routing and forwarding table of a VPWS instance. The processor 1131 determines, in the VPLS instance, a virtual port corresponding to a destination address carried in a packet by searching the routing and forwarding table of the VPLS instance stored in the memory 1132, and determines an egress port of the packet in the VPWS instance by searching the routing and forwarding table of the VPWS instance stored in the memory 1132. As shown in FIG. 11, the main control board 1110 may include a memory 1114. The memory 1114 on the main control board 1110 may also be configured to store a routing and forwarding table. This is not limited in this embodiment of this application.

The interface board 1130 includes one or more network interfaces 1133, configured to receive and forward a packet. The processor 1131 determines, in the VPLS instance based on a destination address carried in a packet received by the network interface 1133, a virtual port corresponding to the destination address carried in the packet. Specific implementation processes are not described herein again. Specific functions of the processor 1131 are not described herein again.

It may be understood that, as shown in FIG. 11, this embodiment includes a plurality of interface boards, and uses a distributed forwarding mechanism. In this mechanism, operations on the interface board 1140 are basically similar to operations on the interface board 1130. For brevity, details are not described again. In addition, it may be understood that the processor 1131 on the interface board 1130 and/or a processor 1141 on the interface board 1140 in FIG. 11 may be dedicated hardware or a chip, for example, a network processor or an application-specific integrated circuit, to implement the foregoing functions. This implementation is generally referred to as a manner of using dedicated hardware or a chip for processing on a forwarding plane. In another implementation, the processor 1131 on the interface board 1130 and/or the processor 1141 on the interface board 1140 may alternatively use a general-purpose processor, for example, a general-purpose central processing unit (central processing unit, CPU), to implement the functions described above.

In addition, it should be noted that there may be one or more main control boards, and when there are a plurality of main control boards, the main control boards may include a primary main control board and a secondary main control board. There may be one or more interface boards. A network device having a stronger data processing capability provides more interface boards. If there are a plurality of interface boards, the plurality of interface boards can communicate with each other by using one or more switching boards, and the plurality of interface boards can jointly implement load sharing and redundancy backup. In a centralized forwarding architecture, the network device may not need the switching board, and the interface board provides a function of processing service data of an entire system. In a distributed forwarding architecture, the network device includes a plurality of interface boards. Data exchange between the plurality of interface boards may be implemented by using a switching board, and the plurality of interface boards can provide a large-capacity data exchange and processing capability. Therefore, a data access and processing capability of a network device in the distributed architecture is better than that of a device in the centralized architecture. A specific architecture that is to be used depends on a specific networking deployment scenario. This is not limited herein.

In a specific embodiment, the memory 1132 may be a read-only memory (read-only memory, ROM), another type of static storage device that can store static information and an instruction, a random access memory (RAM), or another type of dynamic storage device that can store information and an instruction, or may be an electrically erasable programmable read-only memory (EEPROM), a compact disc read-only memory (compact disc read-only memory, CD-ROM) or another compact disc storage, an optical disc storage (including a compact optical disc, a laser disc, an optical disc, a digital versatile disc, a Blu-ray disc, and the like), a magnetic disk or another magnetic storage device, or any other medium that can be used to carry or store expected program code in a form of an instruction or a data structure and that can be accessed by a computer. However, the memory is not limited thereto. The memory 1132 may exist independently, and is connected to the processor 1131 by using a communications bus. The memory 1132 may alternatively be integrated with the processor 1131.

The memory 1132 is configured to store program code, and the processor 1131 controls execution of the program code, to perform some or all of the steps of the packet transmission methods provided in the foregoing embodiments. The processor 1131 is configured to execute the program code stored in the memory 1132. The program code may include one or more software modules. The one or more software modules may be the functional modules provided in the embodiment in FIG. 10. The memory 1114 may also be configured to store program code, and the central processing unit 1112 controls execution of the program code, to perform some or all of the steps of the packet transmission methods provided in the foregoing embodiments.

In a specific embodiment, the network interface 1133 may be an apparatus that uses any transceiver, and is configured to communicate with another device or a communications network, for example, the Ethernet, a radio access network (RAN), or a wireless local area network (WLAN).

Figure 12:
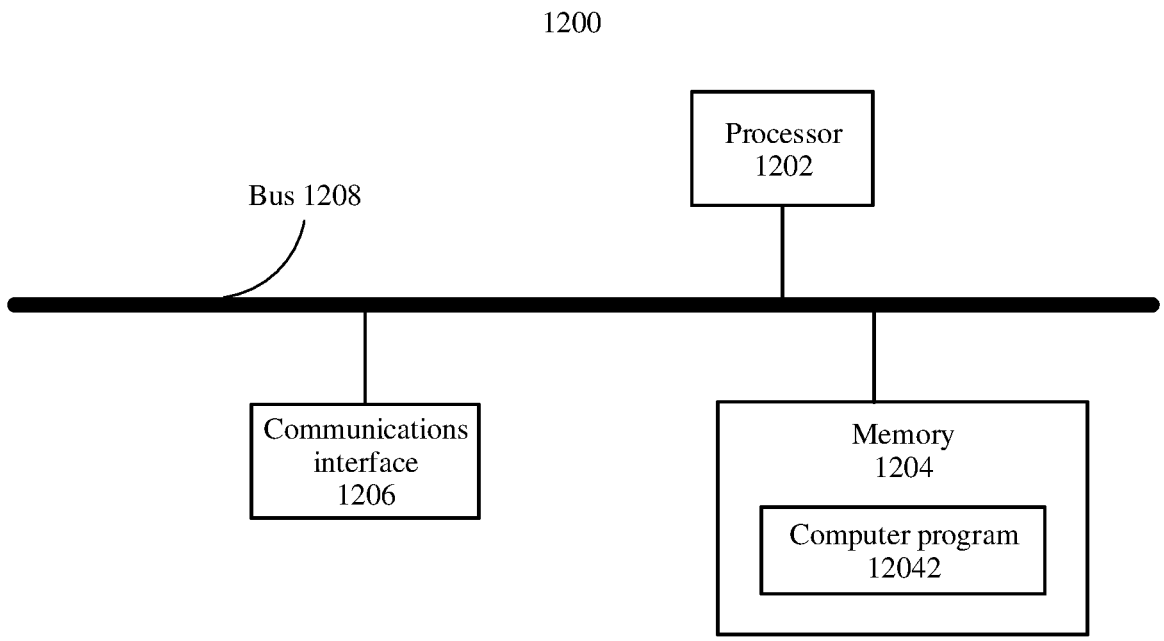
FIG. 12 is a schematic diagram of a hardware structure of another network device according to an embodiment of this application.

FIG. 12 is a schematic diagram of a hardware structure of another network device 1200 according to an embodiment of this application. The network device 1200 may be the first network device in any one of the foregoing embodiments, and the network device 1200 may be a PE device. Refer to FIG. 12. The network device 1200 includes a processor 1202, a memory 1204, a communications interface 1206, and a bus 1208. The processor 1202, the memory 1204, and the communications interface 1206 are communicatively connected to each other by using the bus 1208. The manner of connection between the processor 1202, the memory 1204, and the communications interface 1206 shown in FIG. 12 is merely an example. In an implementation process, the processor 1202, the memory 1204, and the communications interface 1206 may be communicatively connected to each other in another connection manner other than the bus 1208.

The memory 1204 may be configured to store a computer program 12042. The computer program 12042 may include instructions and data. In this embodiment of this application, the memory 1204 may be various types of storage media, for example, a RAM, a ROM, a non-volatile RAM (NVRAM), a programmable ROM (PROM), an erasable PROM (EPROM), an electrically erasable PROM (EEPROM), a flash memory, an optical memory, a register, and the like. In addition, the memory 1204 may include a hard disk and/or a memory.

The processor 1202 may be a general-purpose processor. The general-purpose processor may be a processor that reads and executes a computer program (for example, the computer program 12042) stored in a memory (for example, the memory 1204) to perform a specific step and/or operation. In a process of performing the foregoing steps and/or operations, the general-purpose processor may use data stored in the memory (for example, the memory 1204). For example, the stored computer program may be executed to implement related functions of the determining module 1010 and the processing module 1040. The general-purpose processor may be, for example, but not limited to, a CPU. In addition, the processor 1202 may alternatively be a dedicated processor. The dedicated processor may be a processor specially designed to perform a specific step and/or operation. The dedicated processor may be, for example, but not limited to, a digital signal processor (DSP), an ASIC, an FPGA, or the like. In addition, the processor 1202 may alternatively be a combination of a plurality of processors, for example, a multi-core processor. The processor 1202 may include at least one circuit, to perform all or some of the steps in the packet transmission methods provided in the foregoing embodiments.

The communications interface 1206 may include an interface that is used to implement component interconnection inside the network device 1200, for example, an input/output (input/output, I/O) interface, a physical interface, or a logical interface, and an interface that is used to implement interconnection between the network device 1200 and another device (for example, a network device or user equipment). The physical interface may be a gigabit Ethernet (GE) interface, and may be configured to implement interconnection between the network device 1200 and another device (for example, a network device or user equipment). The logical interface is an interface inside the network device 1200, and the logical interface may be configured to implement interconnection of components inside the network device 1200. It is easy to understand that the communications interface 1206 may be used by the network device 1200 to communicate with another network device and/or user equipment. For example, the communications interface 1206 is used for packet sending and receiving between the network device 1200 and another network device. The communications interface 1206 may implement related functions of the sending module 1120, the receiving module 1130, and the broadcast module 1150. In addition, the communications interface 1206 may further include a transceiver to send and receive a packet. The transceiver may also implement related functions of the sending module 1120, the receiving module 1130, and the broadcast module 1150.

The bus 1208 may be any type of communications bus, for example, a system bus, used to implement interconnection between the processor 1202, the memory 1204, and the communications interface 1206.

The foregoing components may be separately disposed on chips independent of each other, or at least a part or all of the components may be disposed on a same chip. Whether all the components are separately disposed on different chips or integrated and disposed on one or more chips usually depends on a requirement for a product design. Specific implementation forms of the components are not limited in the embodiments of this application.

The network device 1200 shown in FIG. 12 is merely an example. In an implementation process, the network device 1200 may further include other components, which are not enumerated one by one in this specification. The network device 1200 shown in FIG. 12 may forward a packet by performing all or some steps of the packet transmission method provided in the foregoing embodiments.

Figure 13:
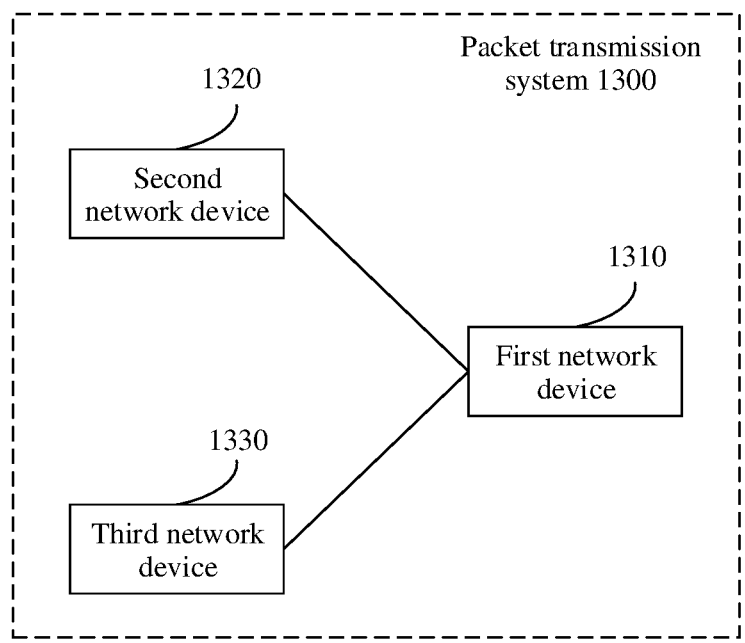
FIG. 13 is a schematic diagram of a structure of a packet transmission system according to an embodiment of this application.

FIG. 13 is a schematic diagram of a structure of a packet transmission system 1300 according to an embodiment of this application. The packet transmission system 1300 includes a first network device 1310 and a second network device 1320. The first network device 1310 is a device in a VPLS network, and the second network device 1320 is a device in a VPWS network.

The first network device 1310 is configured to: determine, based on a destination address carried in a received first packet, a virtual port corresponding to the destination address in a VPLS instance of the first network device 1310, and send the first packet to a second VPWS instance in the second network device 1320 based on the virtual port, where the virtual port is used to indicate a first VPWS instance in the first network device 1310, and the second VPWS instance in the second network device 1320 and the first VPWS instance in the first network device 1310 are VPWS instances used to bear a same service.

The second network device 1320 is configured to forward the first packet by using the second VPWS instance in the second network device 1320.

Optionally, the first network device 1310 is specifically configured to: determine a routing and forwarding table of the first VPWS instance based on the virtual port; and determine, based on the routing and forwarding table of the first VPWS instance, to send the first packet to the second VPWS instance in the second network device 1320.

Continue to refer to FIG. 13. Optionally, the packet transmission system 1300 further includes a third network device 1330, and the third network device 1330 is a device in the VPWS network.

The first network device 1310 is further configured to: determine the virtual port based on the destination address carried in a received second packet, and send the second packet to a third VPWS instance in the third network device 1330 based on the virtual port, where the third VPWS instance in the third network device 1330 and the first VPWS instance in the first network device 1310 are VPWS instances used to bear a same service.

The third network device 1330 is configured to forward the second packet by using the third VPWS instance in the third network device 1330.

Optionally, the first network device 1310 is specifically configured to: determine that a main forwarding path used to bear the service between the first network device 1310 and a device indicated by the destination address is faulty, and send the second packet to the third VPWS instance in the third network device 1330 based on the main forwarding path fault and the virtual port, where the second network device 1320 is located on the main forwarding path, and the third network device 1330 is located on a backup forwarding path used to bear the service between the first network device 1310 and the device indicated by the destination address.

Optionally, the virtual port points to at least two VPWS instances that are of at least two network devices and that are used to bear the service, the at least two network devices including the VPWS instances are located on at least two forwarding paths between the first network device 1310 and the device indicated by the destination address, and the at least two forwarding paths are mutually load sharing paths, or the at least two forwarding paths include a main forwarding path and a backup forwarding path.

Optionally, the VPLS instance includes a port of a virtual port type.

Optionally, the VPLS instance further includes at least one of a port of an AC type and a port of an EVPN Peer type.

Optionally, the first network device 1310 is specifically configured to determine the virtual port corresponding to the destination address based on a fact that a port corresponding to the destination address in a routing and forwarding table of the VPLS instance of the first network device 1310 is the virtual port.

Optionally, the first network device 1310 is specifically configured to: determine the virtual port based on the destination address and a port identifier that are in the routing and forwarding table of the VPLS instance, where the port identifier is used to indicate the virtual port corresponding to the destination address in the VPLS instance and a type of the virtual port; or determine the virtual port based on the destination address, a port identifier, and a port type that are in the routing and forwarding table of the VPLS instance, where the port identifier indicates a port corresponding to the destination address in the VPLS instance, and the port type indicates that a type of the port is a virtual port type.

Optionally, the second network device 1320 is further configured to send a third packet to the first network device 1310.

The first network device 1310 is further configured to: receive, by using the first VPWS instance in the first network device 1310, the third packet sent by the second network device 1320; and generate a forwarding entry in the routing and forwarding table of the VPLS instance based on a source address carried in the third packet and the first VPWS instance, where a destination address in the forwarding entry is the source address carried in the third packet, a port identifier in the forwarding entry is used to indicate the virtual port, and the virtual port is used to indicate the first VPWS instance in the first network device 1310.

Optionally, the first network device 1310 is further configured to: receive a fourth packet, and broadcast the fourth packet through a plurality of ports of the VPLS instance based on a fact that a port corresponding to a destination address carried in the fourth packet is absent from the VPLS instance of the first network device 1310, where the plurality of ports include the virtual port.

Optionally, the first network device 1310, the second network device 1320, and the third network device 1330 are all PE devices.

In a possible implementation, the first network device 1310 may be the network device 1000 shown in FIG. 10.

In another possible implementation, the first network device 1310 may be the network device shown in FIG. 11 or FIG. 12.

In conclusion, according to the packet transmission system provided in this embodiment of this application, the first network device is a device in the VPLS network, and the second network device is a device in the VPWS network. After receiving the first packet, the first network device determines, in the VPLS instance of the first network device based on the destination address carried in the first packet, the virtual port that is corresponding to the destination address and that is used to indicate the first VPWS instance of the first network device, and sends the first packet to the second VPWS instance of the second network device based on the virtual port. The second network device may forward the first packet by using the second VPWS instance. In this way, the first VPWS instance in the first network device may be used as a port member of the VPLS instance in the first network device. In this manner, the first VPWS instance is bound to the VPLS instance to implement interconnection between VPLS and VPWS in the first network device, so that the second network device can forward a packet by using a VPWS forwarding mechanism without learning a MAC address. This helps reduce pressure on the second network device to learn a MAC address, simplify a MAC entry of the second network device, and ensure forwarding performance of the second network device.

An embodiment of this application provides a computer-readable storage medium. The computer-readable storage medium stores a computer program. When the computer program is executed by a processor, all or some of the steps of the packet transmission methods provided in the foregoing method embodiments are implemented.

An embodiment of this application provides a computer program product including instructions. When the computer program product runs on a computer, the computer is enabled to perform all or some of the steps of the packet transmission methods provided in the foregoing method embodiments.

An embodiment of this application provides a chip. The chip includes a programmable logic circuit and/or program instructions. When the chip runs, the chip is configured to implement all or some of the steps of the packet transmission method provided in the foregoing method embodiments.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, some or all of the procedures or functions according to the embodiments of this application are generated. The computer may be a general-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage apparatus, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

It should be understood that "at least one" mentioned in this specification means one or more, and "a plurality of" means two or more. "At least two" means two or more. In this application, unless otherwise specified, "/" means or. For example, A/B may represent A or B. The term "and/or" in this specification describes only an association relationship for associated objects and represents that three relationships may exist. For example, A and/or B may represent the following three cases: Only A exists, both A and B exist, and only B exists. In addition, for ease of clear description, in this application, terms such as "first", "second", and "third" are used to distinguish same items or similar items having basically the same functions. A person skilled in the art may understand that the terms such as "first", "second", and "third" do not limit a quantity and an execution sequence.

Different types of embodiments such as the method embodiments and the apparatus embodiments provided in the embodiments of this application may be mutually referred to. This is not limited in the embodiments of this application. A sequence of the operations of the method embodiments provided in the embodiments of this application can be properly adjusted, and operations can be correspondingly added or deleted based on a situation. Any modified method that can be easily figured out by a person skilled in the art without departing from a technical scope disclosed in this application shall fall within the protection scope of this application, and therefore details are not described again.

In the corresponding embodiments provided in this application, it should be understood that the disclosed apparatus and the like may be implemented in other composition manners. For example, the described apparatus embodiments are merely examples. For example, the unit division is merely logical function division and may be other division in actual implementation. For example, a plurality of units or components may be combined or integrated into another system, or some features may be ignored or not performed. Functions executable by the units may be implemented by using software, hardware, or a combination of software and hardware. In addition, the displayed or discussed mutual couplings or direct couplings or communication connections may be implemented through some interfaces. The indirect couplings or communication connections between the apparatuses or units may be implemented in an electrical form or another form.

The units described as separate parts may or may not be physically separate, and parts displayed as units may or may not be physical units, may be located at one position, or may be distributed on a plurality of network devices (for example, terminal devices). Some or all of the units may be selected based on an actual requirement to achieve an objective of a solution of the embodiments.

The foregoing descriptions are merely specific embodiments of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
determining, by a first network device in a virtual private local area network (LAN) service (VPLS) network, and based on a destination address carried in a received first packet, a virtual port corresponding to the destination address carried in the received first packet in a VPLS instance of the first network device, wherein the virtual port corresponding to the destination address carried in the received first packet indicates a first virtual private wire service (VPWS) instance in the first network device; and
sending, by the first network device, the received first packet to a second VPWS instance in a second network device based on the virtual port corresponding to the destination address carried in the received first packet, wherein the second VPWS instance and the first VPWS instance bear a same service, and the second network device belongs to a VPWS network.

2. The method according to claim 1, wherein sending the received first packet comprises:
determining a routing and forwarding table of the first VPWS instance based on the virtual port; and
determining, based on the routing and forwarding table of the first VPWS instance, to send the received first packet to the second VPWS instance.

3. The method according to claim 1, further comprising:
determining, by the first network device, and based on a destination address carried in a received second packet, a virtual port corresponding to the destination address carried in the received second packet in the VPLS instance of the first network device; and
sending the received second packet to a third VPWS instance in a third network device based on the virtual port corresponding to the destination address carried in the received second packet, wherein the third VPWS instance and the first VPWS instance bear a same service, and the third network device belongs to the VPWS network.

4. The method according to claim 3, wherein sending the received second packet comprises:
when a main forwarding path used to bear the service between the first network device and a device indicated by the destination address carried in the received second packet is faulty, sending, via a backup forwarding path used to bear the service between the first network device and the device indicated by the destination address carried in the received second packet, the received second packet to the third VPWS instance, wherein the second network device is located on the main forwarding path, and the third network device is located on the backup forwarding path.

5. The method according to claim 1, wherein the virtual port corresponding to the destination address carried in the received first packet indicates a third VPWS instance in a third network device, the second network device is located on a first forwarding path between the first network device and the device indicated by the destination address carried in the received first packet, and the third network device is located on a second forwarding path, and wherein the first forwarding path and the second forwarding path are mutual load sharing paths, or the first forwarding path and the second forwarding path are a main forwarding path and a backup forwarding path, respectively.

6. The method according to claim 1, wherein the VPLS instance further comprises at least one of a port of an access circuit (AC) or a port of an Ethernet virtual private network peer (EVPN) Peer.

7. The method according to claim 1, wherein determining the virtual port corresponding to the destination address carried in the received first packet comprises:
determining the virtual port corresponding to the destination address carried in the received first packet based on a routing and forwarding table of the VPLS instance.

8. The method according to claim 7, wherein:
the routing and forwarding table of the VPLS instance comprises a correspondence between the destination address carried in the received first packet and a port identifier, wherein the port identifier indicates the virtual port corresponding to the destination address carried in the received first packet; or
the routing and forwarding table of the VPLS instance comprises a correspondence between the destination address carried in the received first packet, a port identifier, and a port type, wherein the port identifier indicates a port in the VPLS instance corresponding to the destination address carried in the received first packet, and the port type indicates a virtual port type.

9. The method according to claim 7, further comprising:
before determining the virtual port corresponding to the destination address carried in the received first packet, receiving, using the first VPWS instance, a third packet sent by the second network device, wherein the third packet comprises a source address; and
generating a forwarding entry in the routing and forwarding table of the VPLS instance, wherein a destination address in the forwarding entry is the source address, a port identifier in the forwarding entry indicates the virtual port corresponding to the destination address carried in the received first packet, and the virtual port corresponding to the destination address carried in the received first packet indicates the first VPWS instance.

10. The method according to claim 1, further comprising:
receiving a fourth packet, wherein a port corresponding to a destination address carried in the fourth packet is absent from the VPLS instance of the first network device; and
broadcasting the fourth packet through a plurality of ports of the VPLS instance, wherein the plurality of ports comprise the virtual port corresponding to the destination address carried in the received first packet.

11. A system, comprising:
a first network device in a virtual private local area network (LAN) service (VPLS) network; and
a second network device in a virtual private wire service (VPWS) network;
wherein the first network device is configured to:
determine, based on a destination address carried in a received first packet, a virtual port corresponding to the destination address carried in the received first packet in a VPLS instance of the first network device; and
send the received first packet to a second VPWS instance in the second network device based on the virtual port corresponding to the destination address carried in the received first packet, wherein the virtual port corresponding to the destination address carried in the received first packet indicates a first VPWS instance in the first network device, and the second VPWS instance and the first VPWS instance bear a same service; and
wherein the second network device is configured to forward the received first packet using the second VPWS instance.

12. The system according to claim 11, wherein the first network device is further configured to:
determine a routing and forwarding table of the first VPWS instance based on the virtual port corresponding to the destination address carried in the received first packet; and
determine, based on the routing and forwarding table, to send the received first packet to the second VPWS instance.

13. The system according to claim 11, further comprising:
a third network device in the VPWS network;
wherein the first network device is further configured to:
determine, based on a destination address carried in a received second packet, a virtual port corresponding to the destination address carried in the received second packet; and
send the received second packet to a third VPWS instance in the third network device based on the virtual port corresponding to the destination address carried in the received second packet, wherein the third VPWS instance and the first VPWS instance bear a same service; and
wherein the third network device is configured to forward the received second packet using the third VPWS instance in the third network device.

14. The system according to claim 11, wherein the virtual port corresponding to the destination address carried in the received first packet indicates a third VPWS instance in a third network device, the second network devices is located on a first forwarding path between the first network device and the device indicated by the destination address carried in the received first packet, and the third network device is located on a second forwarding path, and wherein the first forwarding path and the second forwarding path are mutual load sharing paths, or the first forwarding path and the second forwarding path are a main forwarding path and a backup forwarding path, respectively.

15. A first network device, comprising:
a non-transitory memory storing instructions; and
a processor, which is configured to execute the instructions, the instructions including instructions to:
determine, based on a destination address carried in a received first packet, a virtual port corresponding to the destination address carried in the received first packet in a virtual private local area network (LAN) service (VPLS) instance of the first network device, wherein the virtual port corresponding to the destination address carried in the received first packet indicates a first virtual private wire service (VPWS) instance in the first network device; and
send the received first packet to a second VPWS instance in a second network device based on the virtual port corresponding to the destination address carried in the received first packet, wherein the second VPWS instance and the first VPWS instance bear a same service, and the second network device belongs to a VPWS network.

16. The device according to claim 15, wherein the instructions further include instructions to:
determine a routing and forwarding table of the first VPWS instance based on the virtual port corresponding to the destination address carried in the received first packet; and
determine, based on the routing and forwarding table of the first VPWS instance, to send the received first packet to the second VPWS instance.

17. The device according to claim 15, wherein the instructions further include instructions to:
determine, based on a destination address carried in a received second packet, a virtual port corresponding to the destination address carried in the received second packet; and
send the received second packet to a third VPWS instance in a third network device based on the virtual port corresponding to the destination address carried in the received second packet, wherein the third VPWS instance and the first VPWS instance bear a same service, and the third network device belongs to the VPWS network.

18. The device according to claim 17, wherein the instructions further include instructions to:
when a main forwarding path used to bear the service between the first network device and a device indicated by the destination address carried in the received second packet is faulty, send, via a backup forwarding path used to bear the service between the first network device and the device indicated by the destination address carried in the received second packet, the received second packet to the third VPWS instance, wherein the second network device is located on the main forwarding path, and the third network device is located on the backup forwarding path.

19. The device according to claim 15, wherein the virtual port corresponding to the destination address carried in the received first packet indicates a third VPWS instance in a third network device, the second network devices is located on a first forwarding path between the first network device and the device indicated by the destination address carried in the received first packet, and the third network device is located on a second forwarding path, and wherein the first forwarding path and the second forwarding path are mutual load sharing paths, or the first forwarding path and the second forwarding path are a main forwarding path and a backup forwarding path, respectively.

20. The device according to claim 15, wherein the instructions further include instructions to:
receive a fourth packet, wherein a port corresponding to a destination address carried in the fourth packet is absent from the VPLS instance of the first network device; and
broadcast the fourth packet through a plurality of ports of the VPLS instance, wherein the plurality of ports comprise the virtual port corresponding to the destination address carried in the received first packet.

* * * * *

UNITED STATES PATENT AND TRADEMARK OFFICE
CERTIFICATE OF CORRECTION

| | |
|---|---|
| PATENT NO. | : 11,811,561 B2 |
| APPLICATION NO. | : 17/645841 |
| DATED | : November 7, 2023 |
| INVENTOR(S) | : Wang et al. |

It is certified that error appears in the above-identified patent and that said Letters Patent is hereby corrected as shown below:

On the Title Page

Item (74), in Column 2, in "Attorney, Agent, or Firm", Line 1, delete "LL" and insert -- LLP --.

Signed and Sealed this
Sixth Day of February, 2024

Katherine Kelly Vidal
*Director of the United States Patent and Trademark Office*